(12) United States Patent
Miller

(10) Patent No.: US 8,965,356 B2
(45) Date of Patent: Feb. 24, 2015

(54) METHOD AND APPARATUS OF PROVIDING MESSAGING SERVICE AND CALLBACK FEATURE TO MOBILE STATIONS

(71) Applicant: Kaseya International Limited, St. Helier (JE)

(72) Inventor: Allan Miller, Palo Alto, CA (US)

(73) Assignee: Kaseya Limited (IE)

( * ) Notice: Subject to any disclaimer, the term of this patent is extended or adjusted under 35 U.S.C. 154(b) by 0 days.

(21) Appl. No.: 13/681,776

(22) Filed: Nov. 20, 2012

(65) Prior Publication Data

US 2013/0078953 A1      Mar. 28, 2013

Related U.S. Application Data

(63) Continuation of application No. 13/228,689, filed on Sep. 9, 2011.

(60) Provisional application No. 61/381,417, filed on Sep. 9, 2010.

(51) Int. Cl.

| | |
|---|---|
| H04M 3/00 | (2006.01) |
| H04W 8/22 | (2009.01) |
| H04W 4/00 | (2009.01) |
| H04W 4/12 | (2009.01) |
| H04W 24/00 | (2009.01) |
| H04L 29/08 | (2006.01) |
| H04M 1/725 | (2006.01) |
| H04W 4/14 | (2009.01) |

(52) U.S. Cl.
CPC ............... *H04W 8/22* (2013.01); *H04W 4/003* (2013.01); *H04W 4/12* (2013.01); *H04W 24/00* (2013.01); *H04L 67/025* (2013.01); *H04L 67/04* (2013.01); *H04M 1/72522* (2013.01); *H04M 1/72552* (2013.01); *H04W 4/14* (2013.01)
USPC ........ 455/419; 455/418; 455/404.2; 455/434; 709/203; 709/217; 709/224

(58) Field of Classification Search
CPC ... H04L 69/22; H04L 41/082; H04L 43/0811; H04L 41/0803; H04L 29/0653; H04L 61/10; H04L 61/106
USPC ............... 455/418, 419, 404.2, 434; 709/203, 709/217–219, 224
See application file for complete search history.

(56) References Cited

U.S. PATENT DOCUMENTS

| | | |
|---|---|---|
| 2002/0137500 A1 | 9/2002 | Brooking et al. |
| 2004/0196965 A1 | 10/2004 | Birger et al. |
| 2005/0064859 A1 | 3/2005 | Kotzin et al. |
| 2007/0293199 A1* | 12/2007 | Roundtree et al. ......... 455/414.1 |
| 2009/0199176 A1 | 8/2009 | Nath et al. |
| 2010/0279673 A1 | 11/2010 | Sharp et al. |
| 2011/0105154 A1* | 5/2011 | Kim .............................. 455/458 |
| 2011/0125898 A1* | 5/2011 | Hassan et al. ................. 709/225 |
| 2011/0126192 A1* | 5/2011 | Frost et al. .................... 717/178 |

\* cited by examiner

*Primary Examiner* — Christopher M Brandt
*Assistant Examiner* — Joseph Dean, Jr.

(57) ABSTRACT

Disclosed are an apparatus and method of performing automated administrative operations on a mobile device. One example method may include determining via a hosted server that an action needs to be performed by a mobile device under management. The method may further include generating a message via the hosted server, the message includes the action, and transmitting the message to the mobile device under management, and receiving a result message from the mobile device under management responsive to the transmitted message, the result message indicating that the action has been satisfied.

20 Claims, 28 Drawing Sheets

METHOD AND APPARATUS OF PROVIDING MESSAGING SERVICE AND CALLBACK FEATURE TO MOBILE STATIONS

CROSS-REFERENCE TO RELATED APPLICATIONS

This application is a continuation of and claims the benefit of co-pending application Ser. No. 13/228,689 entitled "METHOD AND APPARATUS OF PROVIDING MESSAGING SERVICE AND CALLBACK FEATURE TO MOBILE STATIONS," filed on Sep. 9, 2011, which is a non-provisional of application 61/381,417, entitled "Mobile Endpoint", filed on Sep. 9, 2010. The entire contents of each of which are hereby incorporated by reference herein.

TECHNICAL FIELD OF THE INVENTION

This invention relates to providing a messaging service and related features to mobile stations.

BACKGROUND OF THE INVENTION

Phones are becoming increasingly popular computing platforms which perform the same operations as computers and other computing device platforms. Aside from the limited real estate of the hand held devices and related smartphone displays, such devices still have enough processing power to become the new computing platform for everyday computing. In fact, smartphones and other handheld computing devices tend to have better network connectivity and portability than the current devices used in today's computing environment.

The voice feature of the smartphone may be considered a mere telephone application as opposed to a primary function. Voice communication is no more or less important than other communication mechanisms, such as chat and email, and is no more or no less important than other application classes, such as word processing and web browsing. The public perception of "phones" has finally begun to change after the introduction of the tablet computing device (e.g., iPad®). At the current rate of technology trends, there will be much fewer desktops and laptops in 5-10 years, similar to the way mainframe computers have become almost entirely obsolete.

SUMMARY OF THE INVENTION

One embodiment of the present invention may include a method that includes monitoring operations performed by a mobile device, automatically determining an application that needs to be executed on the mobile device, and generating a token responsive to the automatic application determination. The method may also include transmitting the token to the mobile device to establish a secure communication channel with a mobile agent router which authenticates and establishes a route for the mobile device to receive the application data based on the token and transmitting a message to the mobile device using the secure communication channel. The method may also include parsing the message to obtain an application that needs to be installed on the mobile device.

Another example embodiment of the present invention includes an apparatus including a processor configured to monitor operations performed by a mobile device. The processor also automatically determines an application that needs to be executed on the mobile device, and generates a token responsive to the automatic application determination. The apparatus also includes a transmitter configured to transmit the token to the mobile device to establish a secure communication channel with a mobile agent router which authenticates and establishes a route for the mobile device to receive the application data based on the token, and to transmit a message to the mobile device using the secure communication channel. The processor is further configured to parse the message to obtain an application that needs to be installed on the mobile device.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
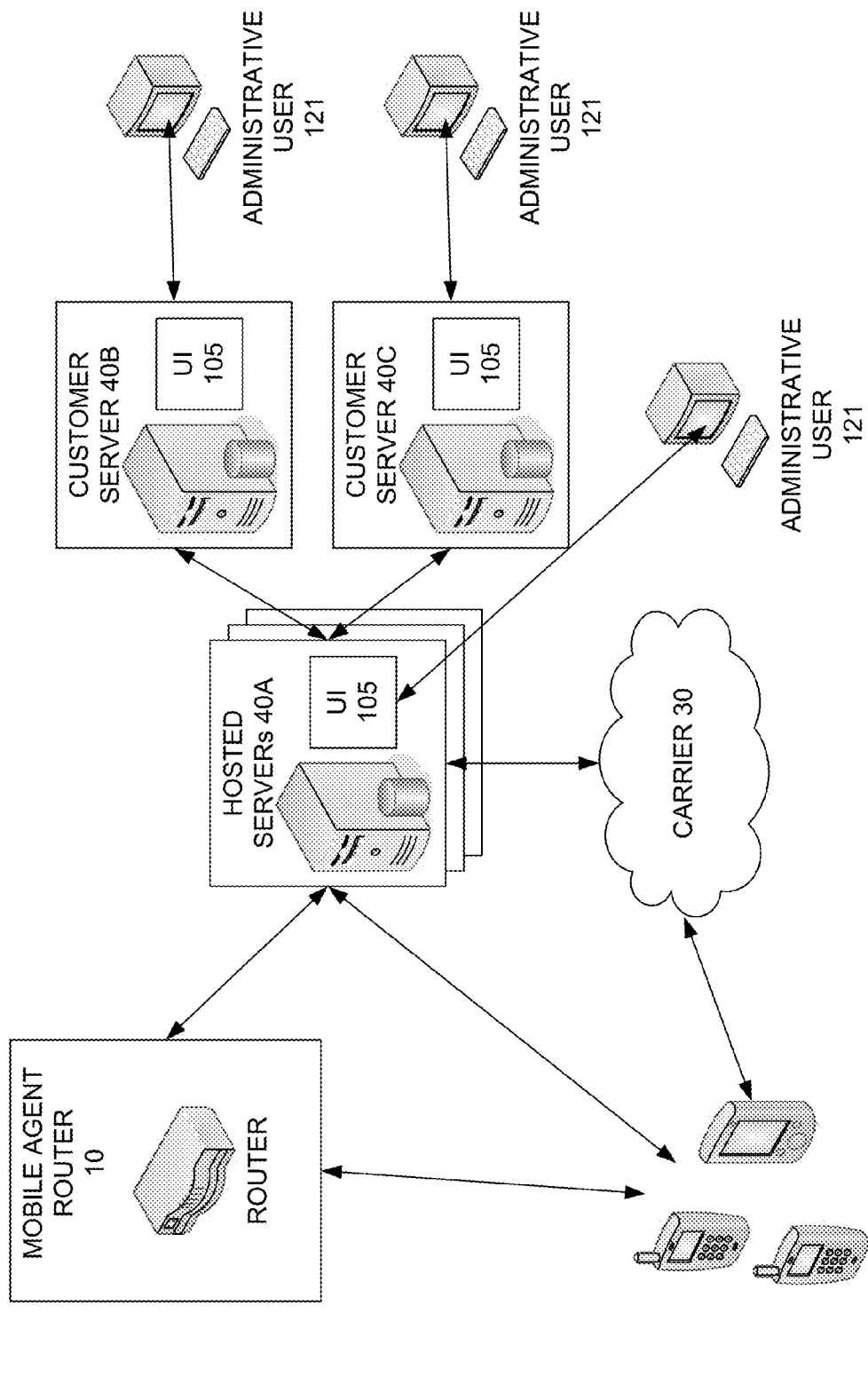
FIG. 1 illustrates an example communication network configuration, according to example embodiments of the present invention.

FIG. 1 illustrates an example network configuration according to example embodiments. Referring to FIG. 1, a mobile agent router 10 handles certain provisioning operations for the end user/mobile devices 20. The mobile devices 20 may include a cellular phone, mobile station, tablet computing device and/or a smartphone configured to communicate with a base station and/or a WiFi communication service provider (e.g., network router).

Once the mobile agent router 10 performs a provisioning operation, each mobile device 20 communicates directly with one of the hosted server(s) 40A. The server configuration provides the scalability to support tens of thousands of mobile devices 20. The servers 40A are configured to manage device communications and are configured to provide control over the configurations needed for mobile devices 20 to access the carrier networks 30 and notification services (e.g., short messaging service (SMS)).

Communication between the different servers 40A-40C is performed by using web-based services. In addition, communication from mobile devices 20 to the hosted servers 40A is also performed using web services. The hosted servers 40A provides a limited amount of queuing capabilities, however, the servers do provide a concentrator for communication to the mobile devices 20. It is possible to run the communication configuration without the servers in which case the mobile devices will communicate directly with the customer servers 40B and 40C. It is also possible to manage mobile devices directly from the hosted servers 40A.

The agents or administrative users 121 respond to asynchronous requests via a user interface (UI) 105. The communication may be provided by a notification mechanism. In one example, a SMS is used as the notification mechanism that traverses different communication platforms (e.g., cellular, Internet, private data network, etc.). Some mobile devices, such as the iPhone®, may require the use of a private notification service in order to implement an asynchronous agent response.

Communication with a mobile device may include actions and results. An action is a command with zero or more parameters. Parameters are position-oriented so the meaning of a parameter depends on its position in the parameter list (i.e., ranking) as well as on the command itself. Parameters are always strings. A command can have optional parameters, and will generally be at the end of the parameter list. Semantically, an action is a request generated by an administrator to perform an operation on a device under management (i.e., a mobile device 20). An action originates at a hosted server 40A and is processed by a mobile device 20.

A result may be an XML string. A result format depends on the action that generated the result. Every action elicits a result, even if the result is only a simple yes/no status on the outcome of the action. Semantically, a result is the result of an action, which originates at a mobile device 20, and is processed by a hosted server(s) 40A.

SMS messages generated by a mobile device 20 or a server 40A must be able to carry actions but not necessarily results. SMS messages have their own simplified format instead of using XML, which provides efficiency in space requirements since there is such a small limit on SMS message size. Actions included in SMS messages provide functionality even when voice or data connectivity is not available or not working, since certain actions can be handled by the mobile device 20 without server 40A interaction.

Provisioning a new device may include a series of operations necessary to bring a new mobile device into the communication network system. Once a mobile device 20 has been provisioned, actions may be taken by certain parties, such as allowing administrative users 201 to complete their part of the provisioning process. This provisioning procedure may minimize the amount of input required from the end users of the mobile devices 20 by providing communication options which are convenient and seamless.

Security of the mobile communication environment may also be increased by limiting the opportunities for a malicious administrator to take over management of a device simply by knowing information, such as a phone number, which is often public information. Additional features may include allowing an evaluation to support the process where mobile devices 20 are operated in an evaluation mode for some period of time and then converted to paying customers.

According to example embodiments of the present invention, a system ID may be generated when the customer server is set up. A relatively short numeric code (i.e., 10-digit code) may be used to check digits so that the validity can be verified locally. The check digits are used to prevent data entry errors, and thus its generation does not need to be cryptographically secure. For example, an ISBN check digit may be used. A device identifier (ID) is generated when the agent begins the first session with the mobile device 20.

The device ID may be arbitrarily large and is generally not transmitted in the clear (unsecured). The system ID is communicated from the administrative user 121 to the end users out-of-band. Each end user may be required to submit the received system ID to the mobile agent to complete the provisioning procedure. For example, the administrative user 121 might use SMS or email to send the system ID to the end users, or post it on a corporate web site, etc. If the mobile device 20 supports the procedure, the process of clicking on a URL can be used to enter the system ID. This way, the URL can be included in a message or on a web site.

During the provisioning procedure, the device ID is transmitted to the mobile agent router 10 and the hosted server 40A, and the address of the hosted server 40A is also transmitted to the mobile agent router 10. Such information also includes the system ID, which is transmitted using an encrypted protocol such as SSL. The mobile agent router 10 uses the system ID to transmit the device ID to the proper hosted server 40A, and also transmits the address of the proper hosted server 40A to the mobile device 20. At this point, the device ID and system ID are stored at various different network entities, such as, the mobile device 20, the mobile agent router 10, the hosted server(s) 40A managing the device communications, and/or the customer server(s) 40B and 40C managing the device. The device ID can be used for subsequent identification and transmission.

One or more phone numbers for the mobile device 20 must be available in order to send SMS messages to the mobile device 20. If the mobile agent can automatically determine the phone number, this process may be used. If not, the end user must manually enter the phone number manually. The end user always has the option to change the phone number used for the mobile device. Whenever the phone number is set or changed, the hosted server 40A sends an SMS message to the device to verify the number before accepting it as valid. If possible, the mobile agent responds to the message automatically, otherwise the end user responds for the validation procedure.

During the setup of the customer server(s) 40B and 40C, once the system ID is assigned, the mobile agent router and the hosted server are contacted and the system ID is registered with those devices providing a callback URL to use for web services. At this time, the system ID has not been transmitted in the clear at all, so it is safe for the mobile agent router 10 and the hosted server 40A to trust the system ID.

Referring to FIG. 1, according to one example the hosted servers 40A may be down or otherwise unavailable. The customer server(s) 40B and/or 40C will then mark the action as one that needs to be re-tried at a later time. The action can be too large to fit into the SMS message. In this case, a special marker (e.g., web address, file transfer information, metadata, etc.) is inserted into the SMS message instead of the action, and the agent uses a web service to retrieve the action from the hosted server 40A. The marker may indicate a web address to download the action for further processing. According to one example, the SMS message may be lost since not all carriers implement store-and-forward for the SMS, so if the mobile device 20 is turned off then the delivery will fail. The hosted server 40A will retry actions on a periodic basis if no corresponding result is received (i.e., response message, confirmation message, etc). As may be observed, FIGS. 1-4 illustrate example network configurations which may be setup to perform the example provisioning, notification services and related features described throughout this disclosure. Like features and elements illustrated in certain drawings may be referred to for similar purposes and functionality in other drawings.

SMS notifications, updates and related communication signaling may be replaced or augmented by a different notification mechanism, protocol, or related communication signaling. In the event that the operation signaling and message transfers fail during the course of a provisioning operation, notification operation, updating operation and/or related operation, the agent may create a corresponding result with a failure status, and provide as much additional information as possible in the result to characterize and diagnose the result.

Figure 2:
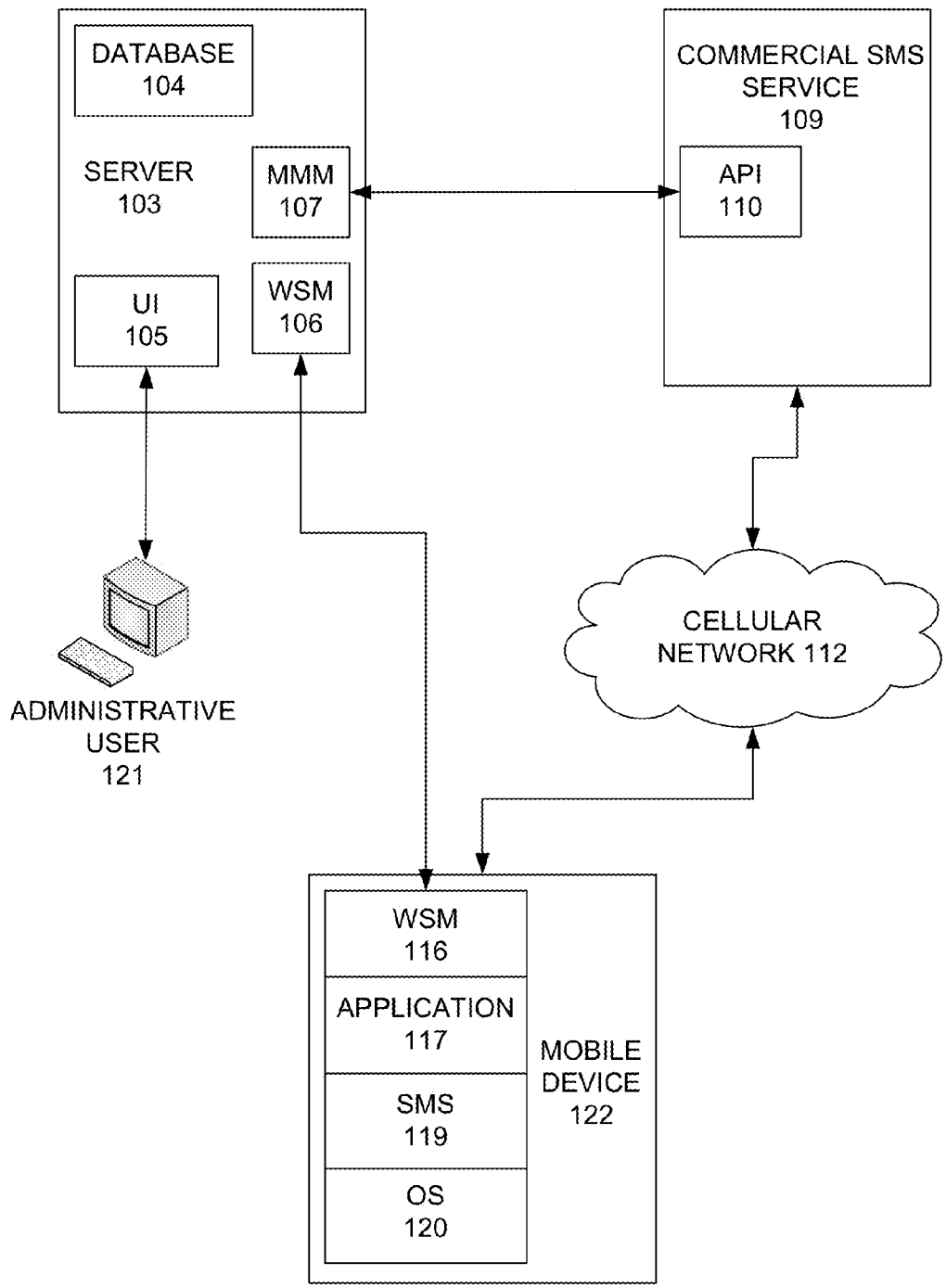
FIG. 2 illustrates another example communication network configuration, according to an example method of operation of the present invention.

FIG. 2 illustrates a detailed logic diagram of a communication network system architecture, according to example embodiments of the present invention. Referring to FIG. 2, an example operation of the system is described in detail below. An administrative user 121 uses a web browser or similar interfacing application to communicate with a server 103 using a browser-based protocol, such as, the HTTP protocol. The administrative user 121 communicates with the server 103 to monitor and/or manage a plurality of mobile devices by initiating service request messages.

An end user may operate a mobile device 122 that communicates with a cellular network 112. The server 103 provides a user interface (UI) component 105 that manages the HTTP interaction with the administrative user 121, and also provides a database 104, a message management module (MMM) 107, and a web service module (WSM) 106. When the administrative user 121 performs a management and/or monitoring action that requires action on one or more of the mobile devices 122, the MMM 107 determines which of the mobile devices operating on the cellular network 112 needs to be notified via a notification service.

A signaling procedure for updating a mobile device 122 is described with reference to FIG. 2. The messaging module (MMM) 107 initiates the process by implementing a web service protocol, which can instead be a private application programming interface (API) to send a request to a commercial SMS service 109 through an API management module 110 associated with the service. The request is formatted as a regular SMS message, with a certain amount of text and/or a telephone number that specifies the address of the mobile device 122. The SMS service uses a private interface to communicate with the cellular network 112 to send a SMS message to the mobile device 122. The request may be initiated by the administrative user 121 and sent to the server 103 to be forwarded to the mobile device 122 as a SMS message to initiate a particular service (e.g., provisioning, update, etc.).

The mobile device 122 may be one of many mobile devices operating on the cellular network 112. The mobile device 122 may have a short messaging service (SMS) processing module 119 that receives and processes the SMS message(s). The SMS module 119 is integrated within the overall operating system (OS) 120 of the mobile device 122. The OS 119 provides a hook function to notify a third-party application 117 of the reception and content of the SMS message received by the mobile device 122. A web service module (WSM) 116 may be used to communicate with the cellular network 112 and/or the server 103.

A hook is a subroutine that intercepts a call in the operating system 120 and diverts it to a different program path. For example, a subroutine may be setup to determine when a particular application event is accessed or should be accessed. When the event is initiated, a subroutine may interrupt the normal program flow and initiate a program separate from the OS to perform a specific function. When the application 117 is notified, the application 117 processes the text and uses it to implement certain actions required by the request from the administrative user 121. In order to obtain any additional information needed for this operation, or send results from the operation, a web service module (WSM) 116 may be used to communicate with the WSM 106 on the server 103 through a web service protocol. This action closes the loop on the operation required by the administrative user 121. The above-noted process may take place without any intervention on the part of the end user of the mobile device 122.

The management agent is event-driven, the event server can be centralized (in the "router" 10 of FIG. 1) or distributed (in the various servers 40A of FIGS. 40A-40C), and the agent is autonomous and can be intermittently connected to the administrative user 121 and the mobile device 122. SMS may be used for notifications, which may preserve power consumption, platform independence, and increased reliability. Public-key message digests may also be used to safely transmit destructive commands without concerns for malicious spoofing. The event-driven architecture of the agent reduces costs for bandwidth, and also reduces power consumption of the mobile device 122.

Figure 3:
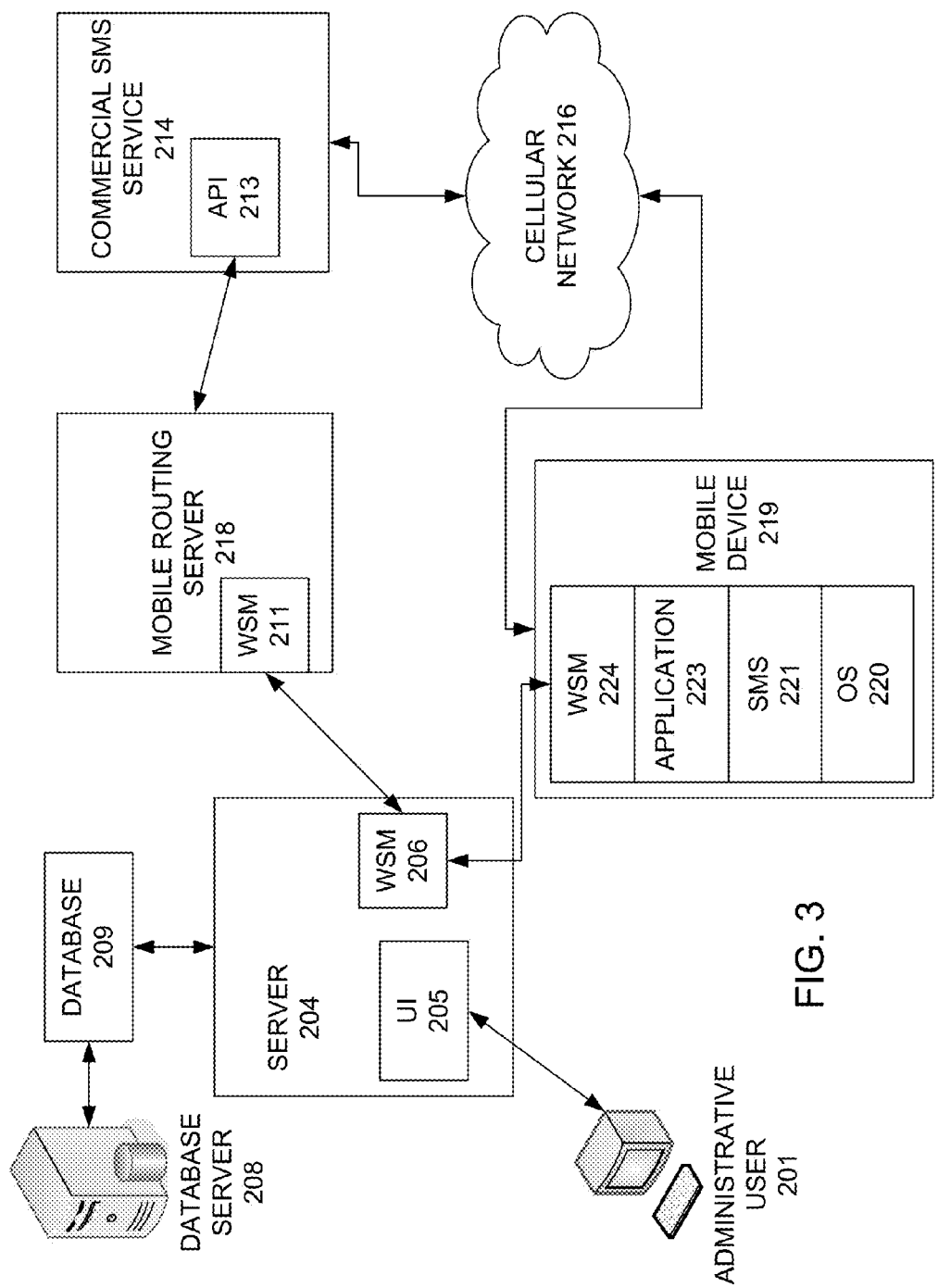
FIG. 3 illustrates yet another example communication network configuration, according to an example method of operation of the present invention.

FIG. 3 illustrates another example of a complete communication cycle communication network. Referring to FIG. 3, in this example, the administrative user 201 may manually initiate a backup operation on a critical subset of a single user's smartphone phone or mobile device 219. The administrative user 201 uses the UI 205 on the customer server 204 to select the phone or mobile device 219 and select contact management and initiate a backup operation for selected critical contact groups.

The server 104 creates an action, which includes assigning a session ID and a sequence number, and stores the action in its corresponding database 209 managed by a database server 208 with a "pending" status. At this point, the administrative user 201 may observe via the server UI 205 that the backup procedure has been initiated and is pending for that particular device. The action contains a command, which is the "backup contacts by group" command, and a parameter, which is the list of group names for which to back up the contacts.

The server 204 uses a web service 206 to transfer the action to the hosted server 204. The action includes header information that includes an identification of the mobile device 219. The hosted server 204 creates a SMS message that includes the action and possibly other actions that are outstanding for the mobile device 219 and sends this message to the mobile device 219. The mobile device 218 receives the SMS message and intercepts it since it has the proper header. The user does not see the message as the received messages invoke processes, threads and procedures which are handled in the background of the operating system. Instead, the agent service parses the message and acts on the message contents. Hiding the message from the user may not be possible on all devices.

The mobile device 219 may be one of many mobile devices operating on the cellular network 216. The mobile device 219 may have a short messaging service (SMS) processing module 221 that receives and processes the SMS message(s). The SMS module 221 is integrated within the overall operating system (OS) 220 of the mobile device 219. The OS 220 provides a hook function to notify a third-party application 223 of the reception and content of the SMS message received by the mobile device 219. A web service module (WSM) 224 may be used to communicate with the cellular network 216 and/or the server 204. The server 204 may communicate with a mobile routing server 218 via a WSM interface 211. The mobile routing server 218 may transfer data to the cellular network 216 through a commercial SMS service 214. The mobile routing server 218 may interface with an application programming interface (API) 213.

The hook may be used as a subroutine that intercepts a call in the operating system 220 and diverts it to a different program path. For example, a subroutine may be setup to determine when a particular application event is accessed or should be accessed. When the event is initiated, a subroutine may interrupt a normal program flow and initiate a new program separate from the OS to perform a specific function. When the application 223 is notified, the application 223 processes the text of the message and uses it to implement certain actions required by the request from the administrative user 201. In order to obtain any additional information needed for this operation, or send results from the operation, a web service module (WSM) 224 may be used to communicate with the WSM 206 on the server 204 through a web service protocol. This action closes the loop on the operation required by the administrative user 201. The above-noted process may take place without any intervention on the part of the end user of the mobile device 219.

The message contains the command for executing the backup operation and the agent performs the backup for the specified groups of devices. In performing this operation, a result is created which contains all the contact information currently being backed up. The result also includes a command completion code indicating success. The agent uses a web service to transfer the result to the hosted server 204. The hosted server 204 then uses a web service to transfer the result to the customer server 204, which stores the contact data in its contact backup database 209. The backup operation may be marked as successfully completed. At this point, the administrative user 201 may observe via the customer server UI 205 that the requested backup operation has been successfully completed for that mobile device 219. Contact information may include user contact information or third party contact information associated with the mobile device.

Referring to FIG. 3, the server UI 205 provides the administrative user 201 with a convenient interface for finding and browsing the recorded error information. Such information may be stored in the database 209 and corresponding server 208. The server 204 may be down or otherwise unavailable. The agent has a periodic task to retry queued results that have not yet been sent. The server 204 also has a retry mechanism. The administrative user 201 may want to see any queued results without delay. The server 204 can use a "refresh" operation to update those results.

Figure 4:
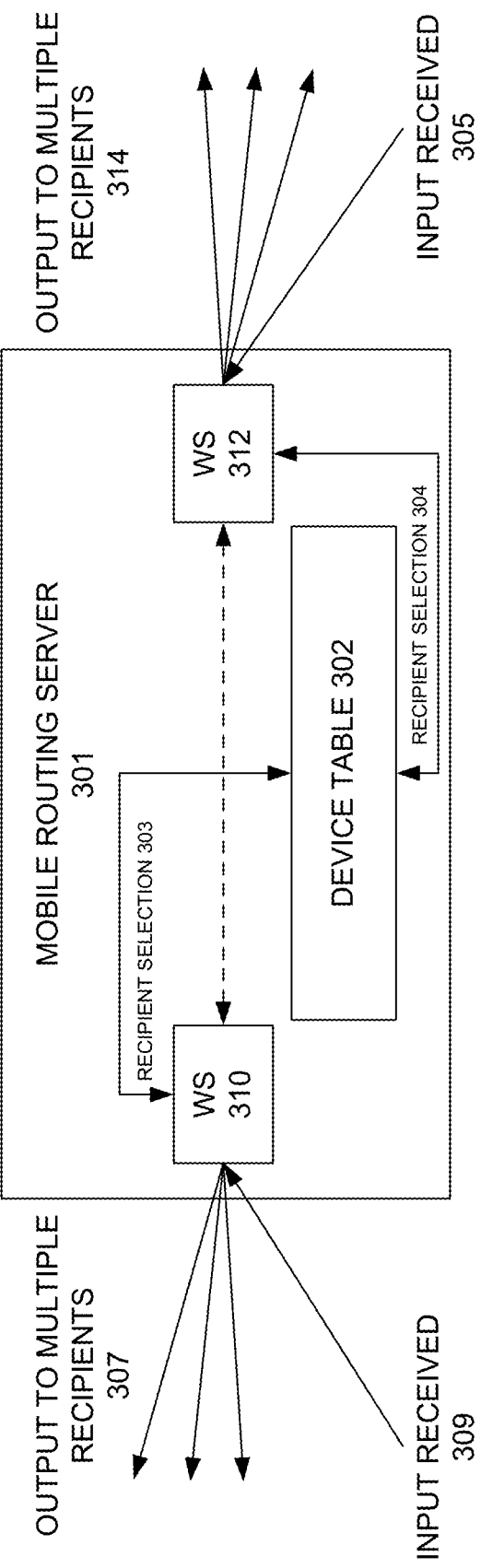
FIG. 4 illustrates an example router configuration, according to an example embodiment of the present invention.

FIG. 4 illustrates a detailed diagram of a mobile routing server, according to example embodiments. Referring to FIG. 4, input signals 305 and 309 may be received from multiple different mobile stations or administrative devices at receivers configured to receive communication signaling. Interfaces provide web service functionality (WS) 310 and 312 to receive recipients' selections 303 and 304 and compare that data to data stored in a device table 302. For example, recipient selections 303 and 304 may be received to request a specific service, install, upgrade, etc. The received selections 303 and 304 may be compared to a device table 302 which includes device information of all the registered devices. An update may then be invoked and sent to all the registered devices via the information included in the device table.

Figure 5:
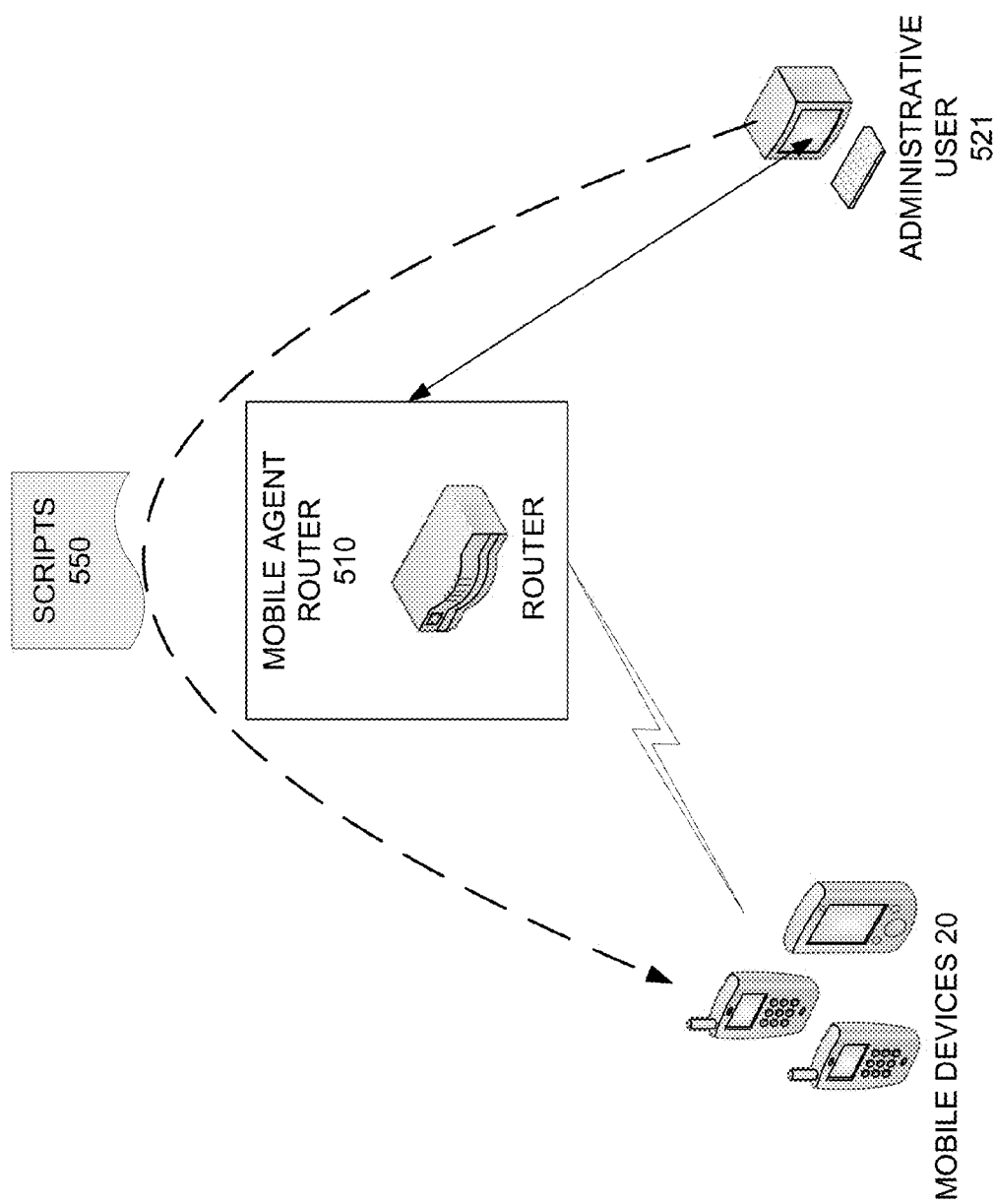
FIG. 5 illustrates an example network configuration of a script generation and delivery procedure according to example embodiments.

FIG. 5 illustrates an example network configuration of a script generation and delivery procedure according to example embodiments. Referring to FIG. 5, an administrative user 521 may initiate a script 550(s) to perform automated update and message transfer operations used to service the mobile users 20. For example, the administrative user may setup a script that initiates update operations periodically. The script may be stored in mobile agent router 510 which runs the script and performs the update operations at the appropriate times dictated by the script 550.

Figure 6:
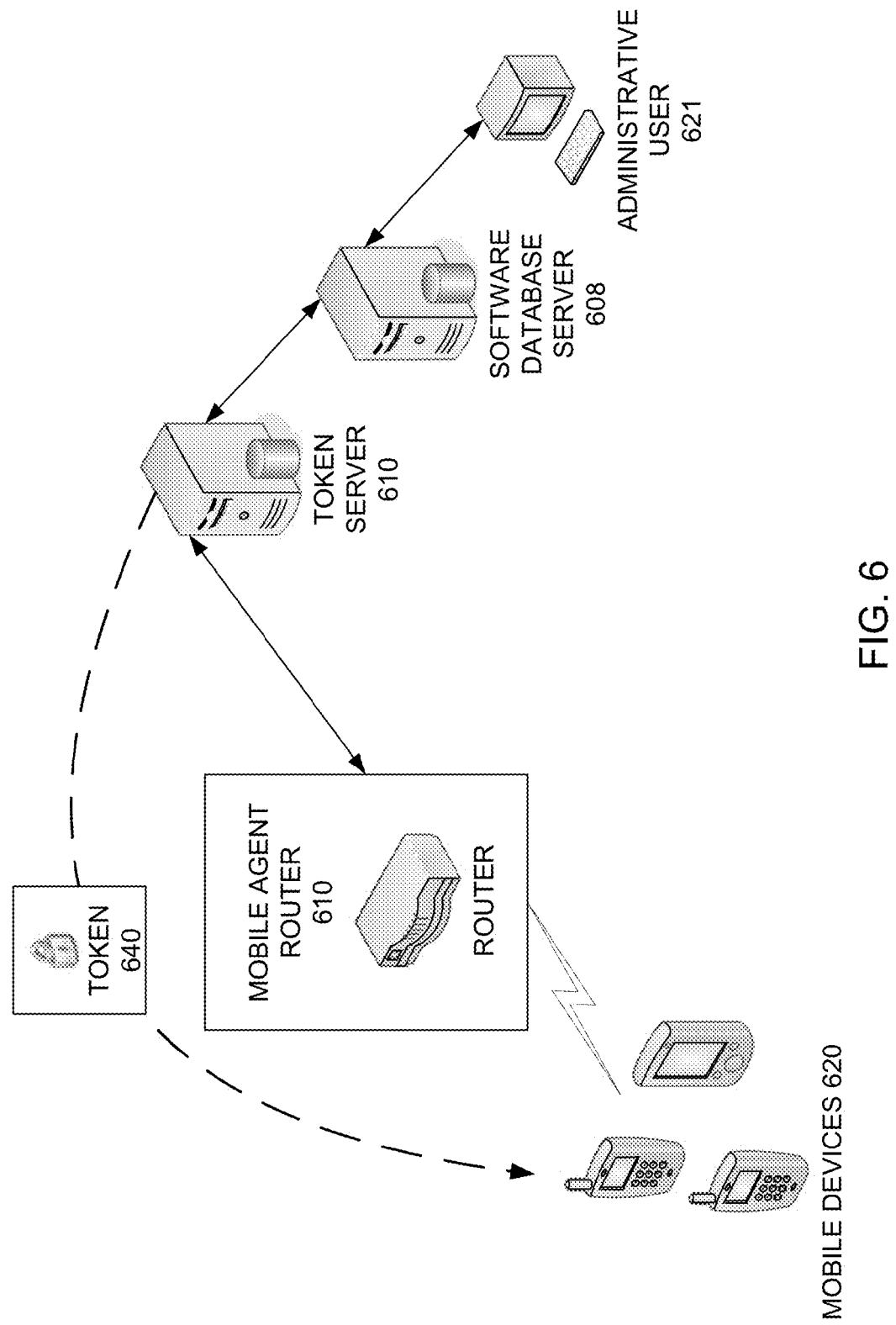
FIG. 6 illustrates an example network configuration of a token communication procedure according to example embodiments.

FIG. 6 illustrates an example network configuration of a token communication procedure according to example embodiments. Referring to FIG. 6, an administrative user 621 may perform an administrative function by accessing a software database server 608 to distribute a stock piece of software as required by the "app store" model, and customize the software on-the-fly to have it report to the correct management console. The method may involve the use of a "semi-private token" 640 that does not have to be carefully guarded and is transmitted to the end user by a variety of communication options. The token 640 may then be used by a well-known central server or mobile agent router 610 to authenticate and route the device to the correct administrative server.

The administrative server or mobile agent router 610 my perform a final authentication and transact the strong secret tokens needed for secure communications. The agent deployment mechanism allows the use of a single installation package, as required by certain application stores, such as Apple or Google's marketplace. The implementation provides a safe mechanism for controlling the devices without excessive complexity on the part of the end user.

Figure 7:
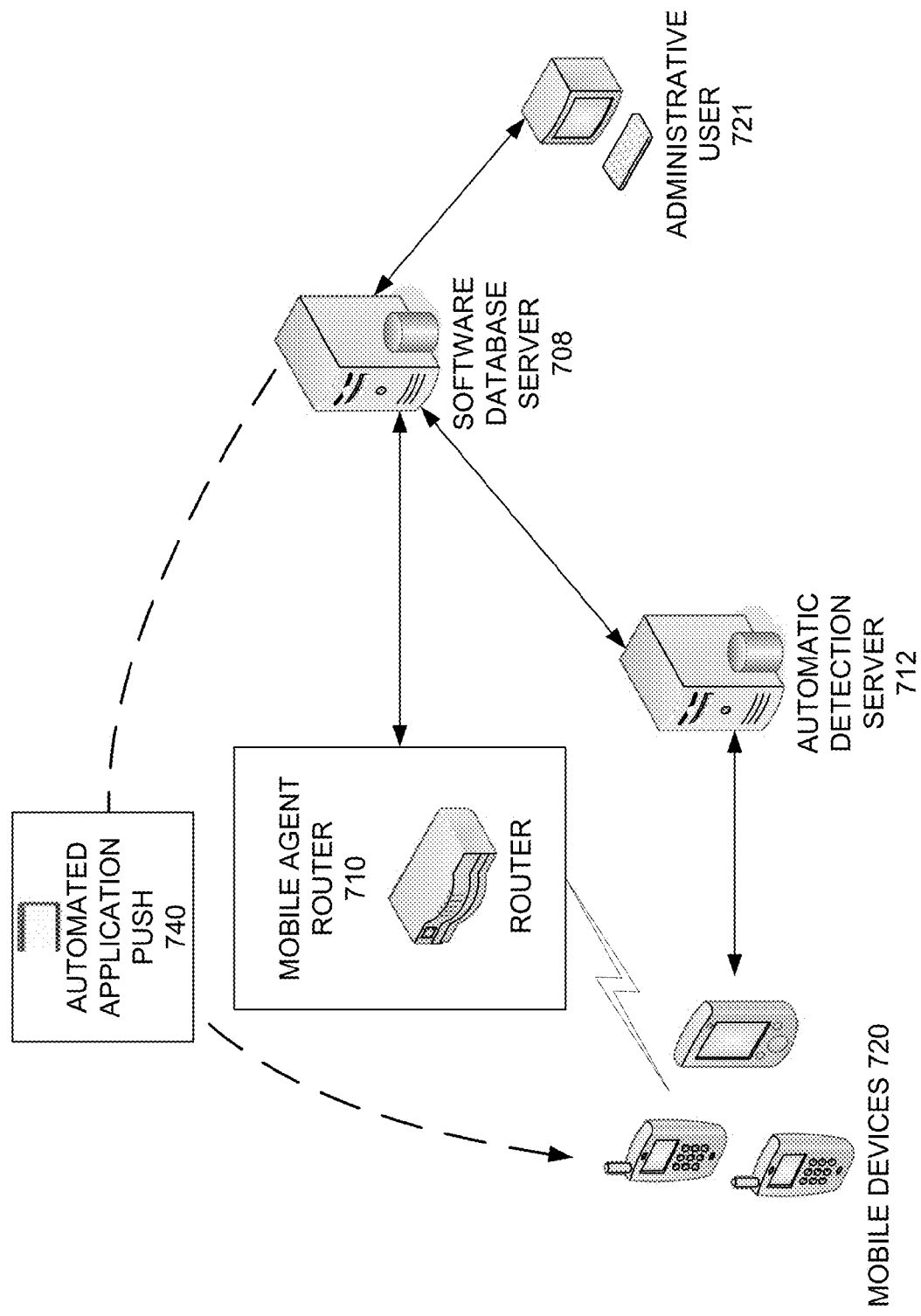
FIG. 7 illustrates an example network configuration of an automated application push configuration according to example embodiments.

FIG. 7 illustrates an example network configuration of an automated application push configuration according to example embodiments. Referring to FIG. 7, an administrative user 721 may initiate a particular updating procedure or related administrative function to the end users of the mobile devices 720. In operation, a request or command may be submitted to the software database server 708 to provide the update. The request may be communicated to the mobile agent router 710. An automated application push 740 may be setup to execute at a particular time to update the mobile devices 720. An automated detection server 712 may then be configured to monitor the status of the applications operating on the mobile device 720 to determine when the next update should occur. The automated detection server 712 may send a service reminder to the administrative user 721 to perform the cycle again when needed.

Data formats used in the various communication operations illustrated above with respect to FIGS. 1-7 are described in detail below. The two underlying protocols used may include web services and SMS messages. The data structure is independent of the protocol. The abstract data structure is described first, followed by the implementation in specific protocols as needed.

There should be a way to uniquely identify mobile devices 20. A telephone number may be used, however, not all mobile devices are phones and mobile devices, such as the Ipad® or Ipod may be used without having an assigned phone number. Also, the same phone may have multiple phone numbers. Traveling users often buy a different SIM for each country where they are traveling. The agent software may not have easy or reliable access to the phone number. As a result, the mobile agent may generate a unique ID when it first runs, and transmit it to the mobile agent router 10 and a corresponding server as part of the provisioning process.

The mobile agent could use some type of hardware ID in the phone to generate a unique ID. If the persistent storage for the generated ID is lost (perhaps by resetting the phone, or uninstalling the agent), the phone will still be recognized if the agent is reinstalled. However, if the "unique" ID turns out to be not unique, then there is no recourse. The only option would be to tell the customer that the two phones cannot be under management on the same server.

Each action has a sequence number that is unique for a single device. This sequence number is analogous to the sequence number used in the TCP protocol. For example, the mobile agent 10 keeps track of the highest sequence numbered action it has processed. If it receives an action with a sequence number less than or equal to the highest sequence number, it discards the action. If it receives an action with a sequence number one greater than the highest sequence number, it processes the action and increments the highest sequence number. If it receives an action with a sequence number more than one greater than the highest sequence number, it queues the action.

The authentication processes used may provide implementing a SSL for all web service interactions. SMS messages are sent in the clear. A shared secret (public keys are not required) may be used. The shared secret can be exchanged over SSL. A version number may be included in this data, so that we can change the definition in a backward-compatible way in the future.

There are two forms of authentication involved in web services. For example, the web service authentication, which is already designed and built into the web services provided by the core services. The web service client includes a username and password hash in the "Authenticate" web service request, and the response contains a session ID. This session ID is then included in all following web services. The session ID is tied to the IP address of the mobile device and has a relatively short lifetime. This authentication may require a username and password.

The mobile product authentication may not be session oriented, and includes sufficient information to perform routing. Each web service request and response includes an authentication header that includes the mobile product authentication. This may include the system ID and device ID as described in "provisioning" procedure above. The device ID is a shared secret, so the presence of a valid device ID serves as the authentication. The presence of the system ID allows all routing and data lookup to be done quickly and efficiently. The recipient confirms that the device ID and system ID match the data stored in the tables. If they do not, then the web service request is logged and discarded, and a response is generated with an "authentication failure" error.

There are two kinds of SMS messages. One is a message sent to a mobile device. These messages contain a 64-bit authentication token, which is created as a message digest, using as input the text of the SMS message with the device ID concatenated at the end. The mobile device confirms that the message digest matches its own, using its device ID. If it does not match then the message is logged and discarded. Another SMS message type includes messages from the mobile device. These messages are the result of an action. For example, this procedure may be used to obtain the phone number of the mobile device 20 from the envelope information of the SMS message, if the mobile agent 10 does not have direct access to the phone number. The action contains a one-time token (nonce) that is included in the request. The originator of the action stores the association between the nonce and the device ID and system ID in a table. The mobile device 20 includes the nonce in its SMS message, as well as a message digest of the message with its device ID concatenated at the end. The eventual recipient of the SMS message uses the nonce to look up the device ID and then verifies the validity of the message digest.

Communication between the mobile device 20 and the mobile agent router 10 may provide, for a web service call, that the web service authentication header be used. If this is an SMS response to a request by the mobile agent router 10, the SMS authentication described for SMS responses from the mobile device 20 to the mobile agent router 10 is used. The SMS authentication described for SMS messages from the mobile agent router 10 to a mobile device 20 is used.

For other communication examples, the servers 40A-40C communicating to the mobile agent router may use a web service authentication header. Communication between the mobile agent router and the servers 40A-40C may also use the web service authentication header. During the provisioning process, the mobile agent sends its device ID to the mobile agent router 10, which in turn sends it to the servers 40A-40C. This transaction may not be truly authenticated. The mobile agent router 10 accepts the device ID without verification. However, the only "attack" it opens up is one where an "attacker" can put a mobile device 20 under control of the "attacked" administrative user 121.

The mobile agent may store the system ID that is entered during the provisioning procedure, and the device ID that it generates. The format of SMS (text) messages that are sent to mobile devices in the mobile endpoint environment to initiate action on the devices is discussed in detail below. The system allows centralized, organized monitoring and administration of mobile devices 20 in the communication environment. Part of this function requires the SaaS global manager (SGM) server to initiate action on a mobile device 20 under management. The SGM server may be any one or more of the servers 40A-40C illustrated in FIG. 1.

In operation, by sending the mobile device 20 a SMS message. The agent software running on the mobile device 20 either intercepts this message automatically or the end user of the device uses the message details to initiate the agent to begin performing various operations. The message itself may include enough information for the agent to initiate the required tasks.

According to example embodiments of the present invention, an example of an SMS message transmitted to a mobile device 20 may include: KME 1.00 000174ef 5d783e9708ffb691 aud( ) loc(1) get (P %20Dat.txt,1024).

Each component of this message is separated by a space. The components are described below. KME—a fixed identifier indicating that this is a KME device control message, 1.00—the version number of the SMS messaging protocol. This allows parsers to be backward-compatible as more features are added to the protocol. 000174ef—a 32-bit hexadecimal sequence ID. The server increments this number by one for each command sent to the device. Since SMS messages can be lost, duplicated, or sent out of order, the agent uses this sequence to reliably order commands. 5d783e9708ffb691—a 64-bit hexadecimal authentication token. This allows the device agent to verify that the message is a legitimate request. This is particularly important since a SMS caller ID can be spoofed easily and certain functions can be very damaging. If the authentication is not valid, the agent reports this fact to the server and discards the message, and aud( ) loc(1) get (P % 20Dat.txt,1024)—are commands to be applied by the mobile device 20.

Each command is a name followed by a parameter list. String parameters are URL-encoded. A sequence ID may be a 32-bit sequence ID that is ignored in the initial implementation of the agent. When implemented, the sequence ID will allow the agent to correctly process SMS messages that are dropped or received out of sequence. For example, the sequence ID may be implemented by waiting a fixed delay for the proper sequence, then directly contacting the server to retrieve commands if the wait times out. Each command has a unique sequence ID. So if a single SMS message has three commands, then the sequence ID of the next message will be three larger than the previous sequence ID. The Sequence ID may be a 32-bit number.

A 64-bit authentication token may be implemented to allow the agent to verify that a message is actually from the server and has not been altered. Authentication will be implemented in a way to preclude both man-in-the-middle and replay attacks. It can probably be as simple as a message digest (e.g., MD5) of the message plus a shared secret. A variant could use a private key to avoid the shared secret exchange, if desired.

The inclusion of commands in the message is not strictly necessary, since the agent can contact the server to retrieve the commands. However, such a configuration may have several practical advantages, such as if the agent can proceed without contacting the server, this may reduce bandwidth usage and charges. Also, SMS may work even if network connectivity is not available. Network connectivity may have been maliciously suspended, for example, in the case of a stolen device.

Each command may include a command name, which is a sequence of three lowercase letters. The commands may also include a left parenthesis, zero or more parameters, and two or more parameters separated by commas. Parameters are positional meaning that the parameter depends on the command. Some commands may have optional parameters. Since parameters are positional, optional parameters follow mandatory parameters. Omitted parameters can be indicated either by successive commas or by closing right parenthesis. Parameters are parsed as strings. The strings are URL-encoded. The implementation of the command may interpret the string as a different data type using a standard parsing. The parameter data types for this specification include: i. String, ii. Integer, iii. boolean, i.e. "true" and "false", iv. right parenthesis, etc. The commands implemented for this specification include "aud"—Audit device information.

The mobile UI uses the existing web service interface to leverage fundamental infrastructure, such as authentication. The mobile UI is an add-on module that uses ASP pages to drop into an existing server. One or more third party services may be used as SMS gateways. Other notification services may include the Apple® push notification service and/or the Android® cloud to device messaging and possibly other similar services.

Figure 8:
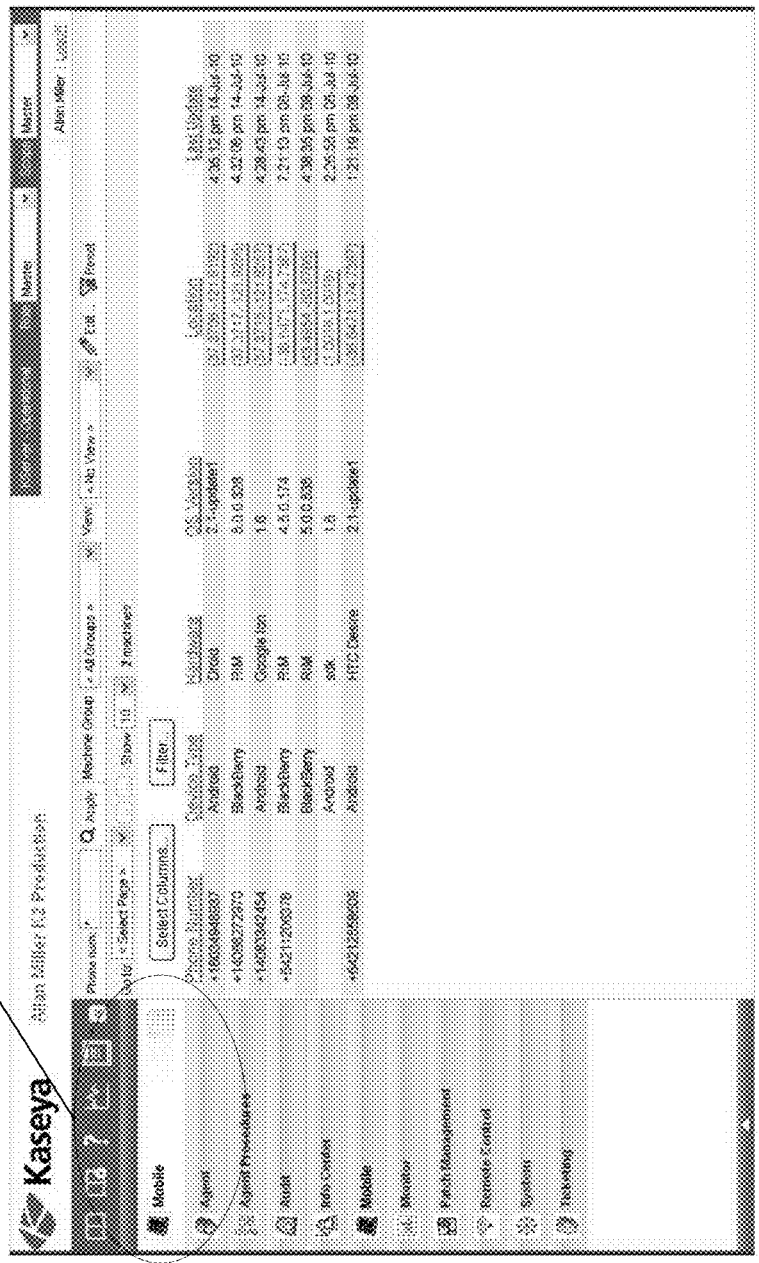
FIGS. 8-26 illustrate example screenshots of example graphical user interfaces (GUIs) and user initiated operations, according to example embodiments of the present invention.
Figure 9:
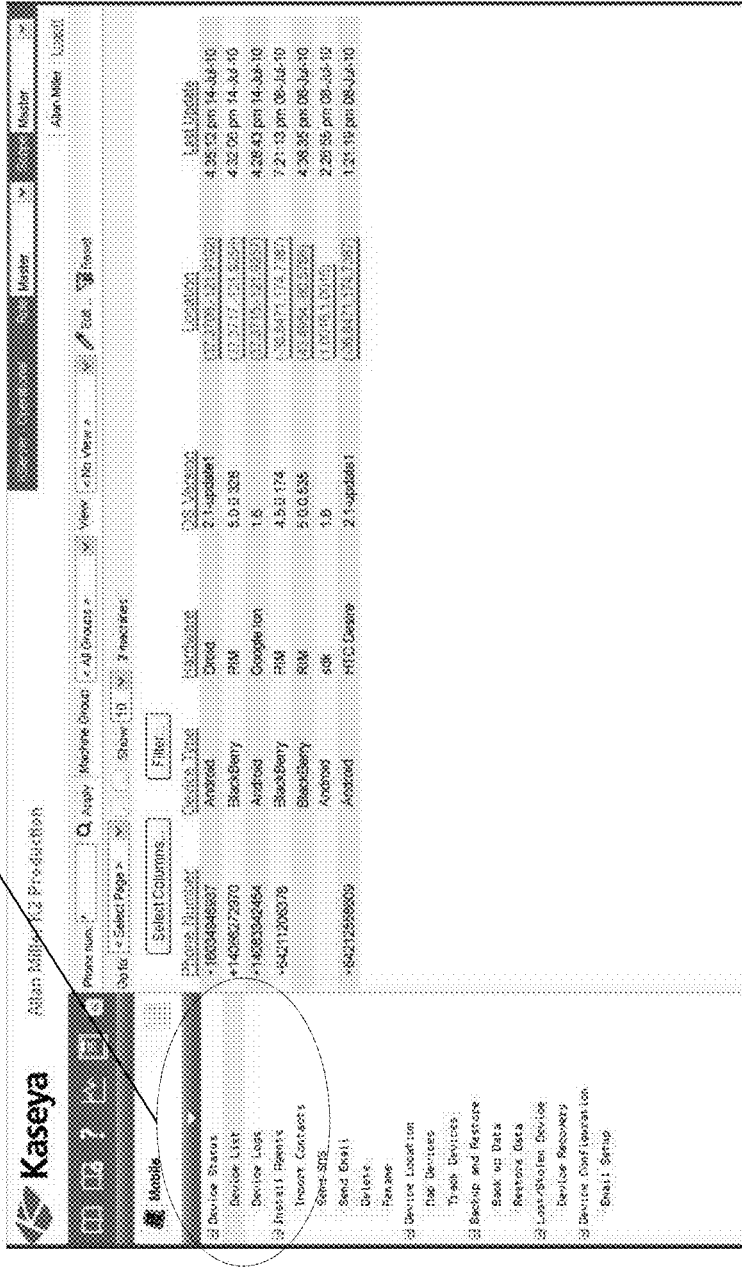

FIG. 8 illustrates an example graphical user interface according to example embodiments. Referring to FIG. 8, screenshot 800 illustrates a user interface user to view various information related to various mobile devices operating in the communication network. The mobile item 802 provides access to the entire mobile menu. FIG. 9 illustrates the "Device List" function selected in the left pane menu 902.

There are three classes of device information, for example, a first information class provides information available for all devices of all types, which is available for all devices being managed. A specific device may be missing one particular piece of information, but it is advertised as being available in the programmatic interface for all devices. This information can be used in all selections, filters, and reports.

A second class of information available for all devices of a specific type may include information that is available for all devices of a specific type. It is advertised as being available in the programmatic interface for devices of that type. For example, a class of phones that runs a certain operating system. This information may or may not be available for use in selections, filters, and reports.

A third class of information is information that is sporadically available for some devices. This information is sometimes available for some devices. It can be viewed on a per-device basis by drilling down via the user options presented in the UI, such information may not be used in selections, filters, or reports.

Figure 10:
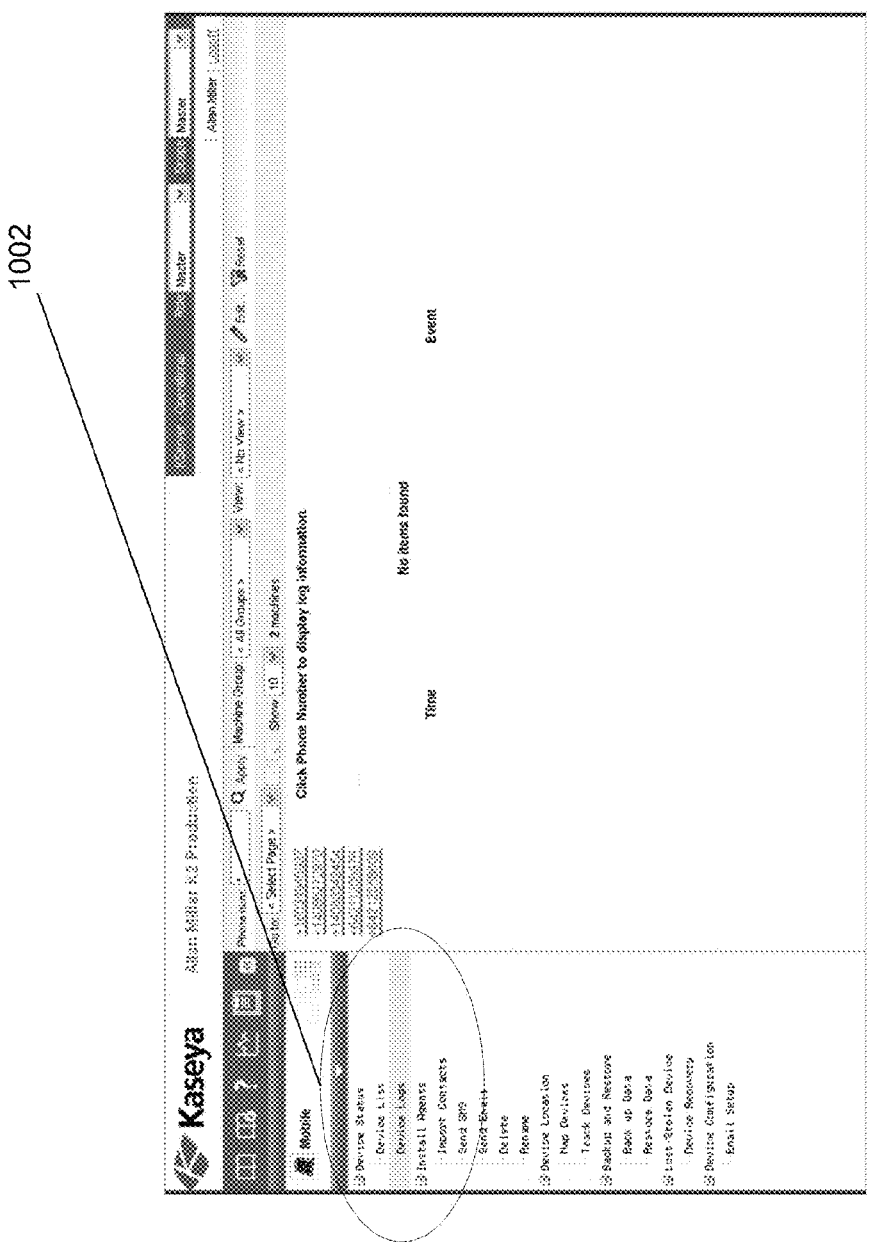

FIG. 10 illustrates the "Device Logs" function 1002 selected in the left pane menu. This function brings up a list of the devices under management and allows the selection of one of those devices. This is analogous to the function of the "Agent Logs" page in the "Agent" section. Clicking on one of the phone numbers brings up the log for that device. The log shows detailed information about the operations taken by the mobile device agent.

Figure 11:
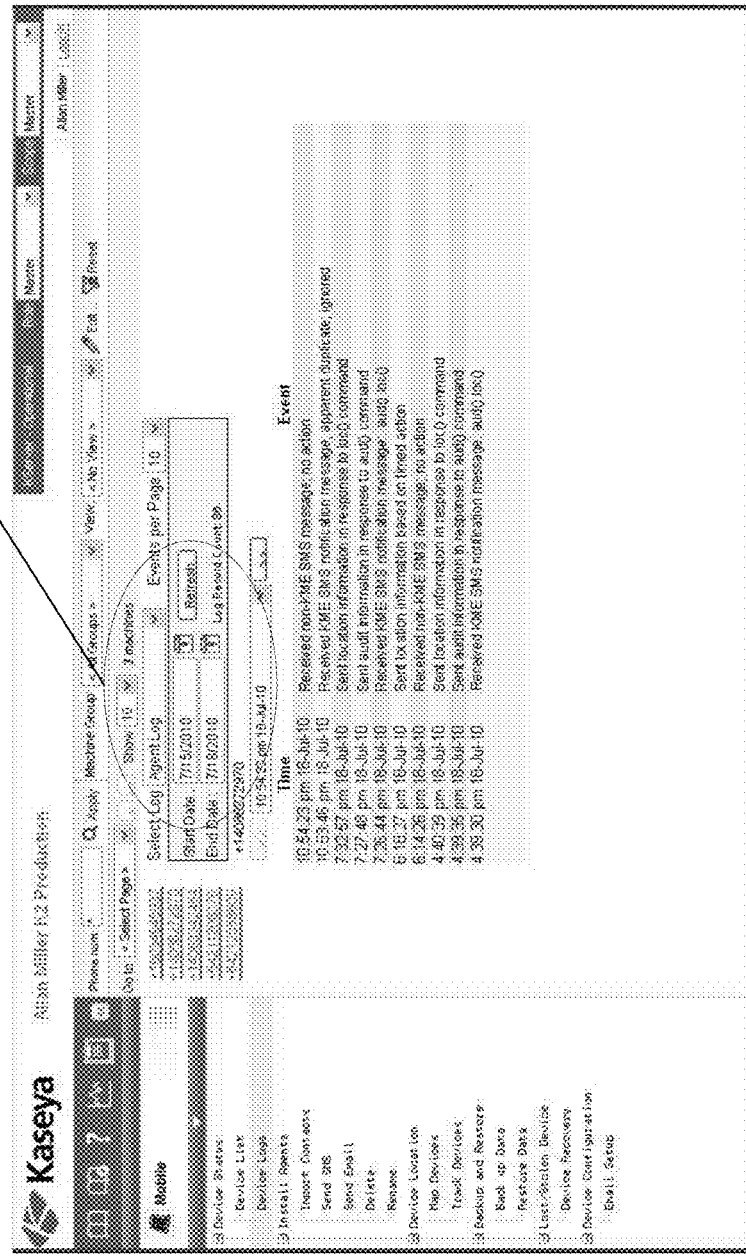
Figure 12:
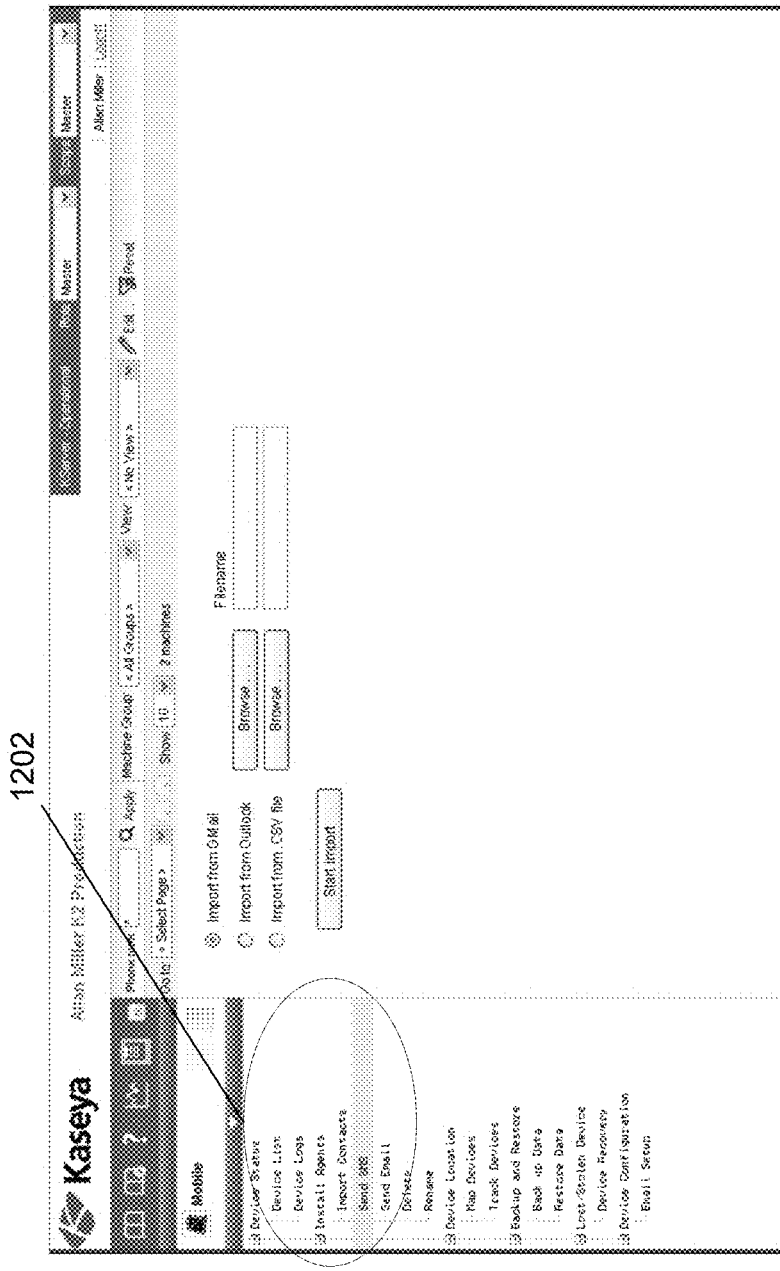

FIG. 11 illustrates a list of a device log for a particular set of log information 1102. The controls above the log listing operate in the same way as the controls on the corresponding "Agent Logs" page in the "Agents" section. FIG. 12 illustrates the "Import Contacts" option 1202 which provides a convenient way to distribute the mobile agent to a large group of existing users. On this screen, contact phone numbers and email addresses can be imported from Gmail® contacts, Outlook® contacts, or comma-delimited (comma separated value) '.CSV' files exported from other mail clients.

Figure 13:
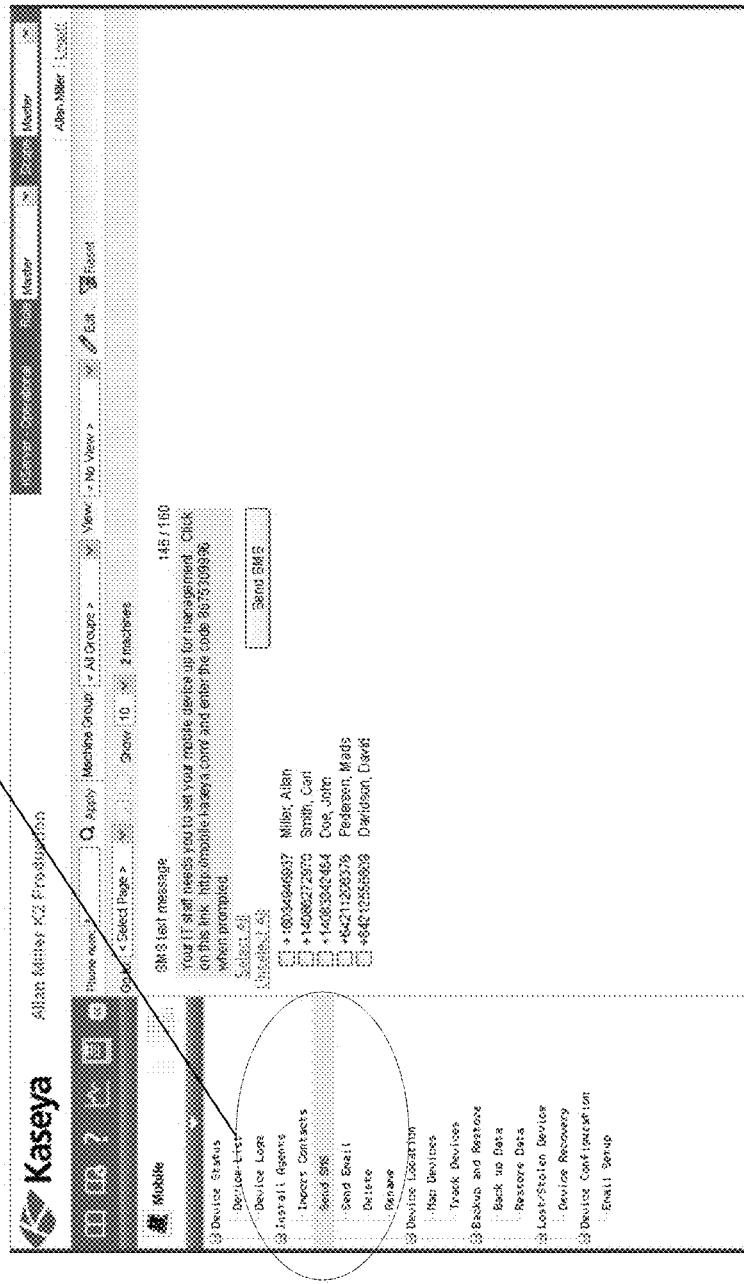
Figure 14:
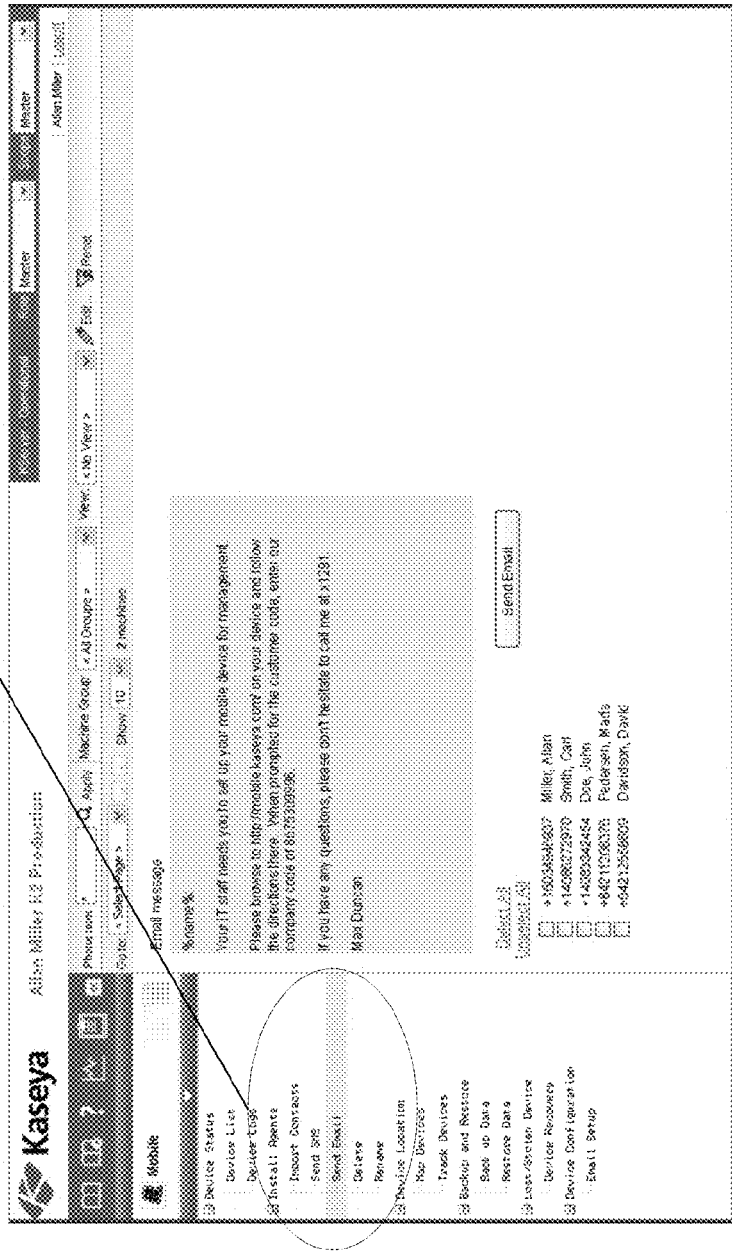

Once a group of contacts has been imported, the contact information can be used to distribute the information for downloading and installing the mobile agent. The "Send SMS" screen 1302 illustrated in FIG. 13 allows the user to customize and send an SMS message with installation information to selected imported contacts. Similarly, the "Send Emails" screen option 1402 of FIG. 14 permits the user to send email presumably knowing that the email will be read on the mobile device.

Figure 15:
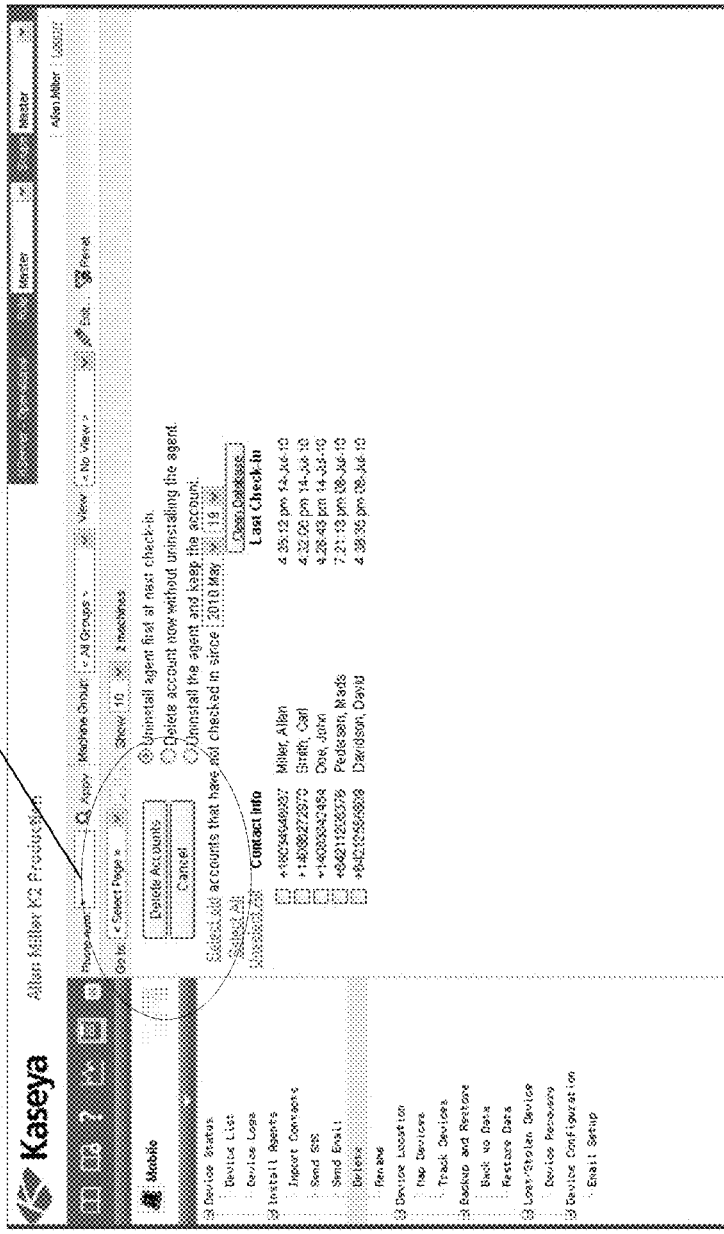
Figure 16:
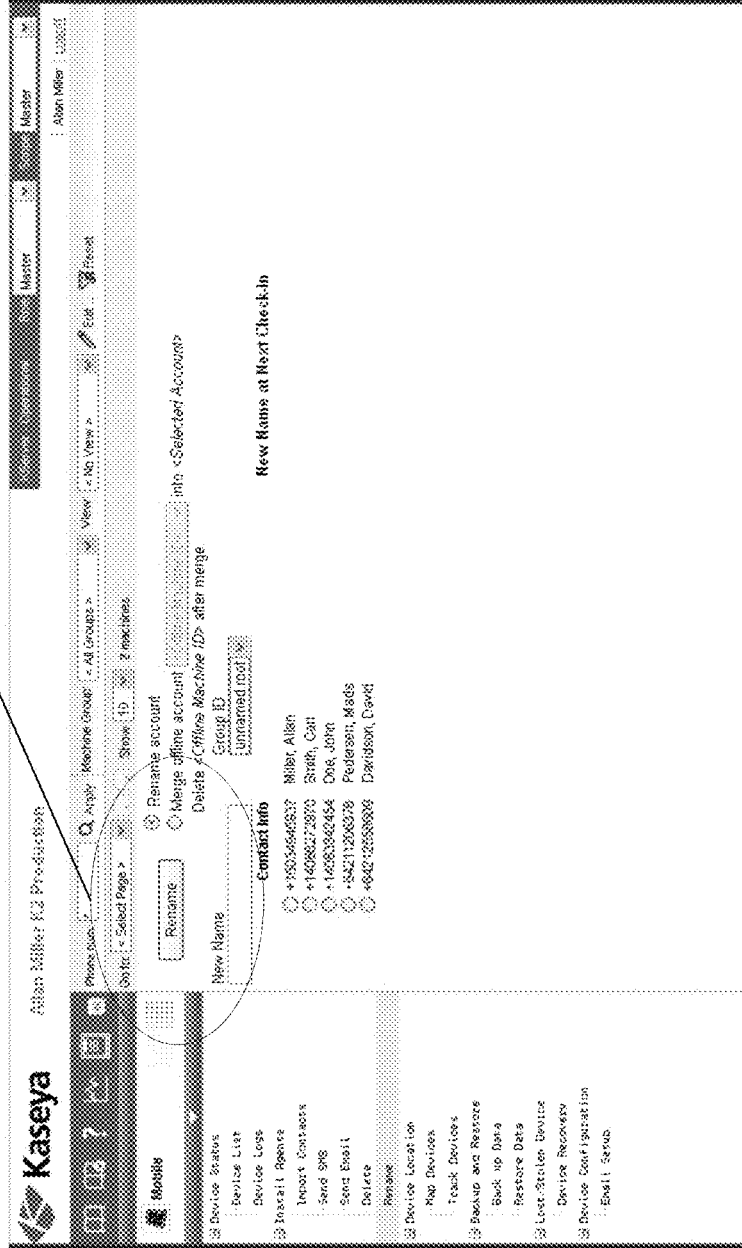

The other two entries in this category, "Delete" and "Rename", are used for managing the server-side entries for mobile agents whose status is known to have changed. These options are analogous to the "Delete" 1502 and "Rename" 1602 screens in the "Install Agents" section of the current "Agent" area (see FIG. 16). The "Delete Accounts" option 1502 provides a way to discard agent entries on the server as illustrated in FIG. 15. The "Device Location" operation provides a way to discover pertinent information about the use of the devices. The "Map Devices" function illustrates the location of multiple devices on the same map, at their latest reported location, while the "Track Device" option provides the location of a single device over time.

Figure 17:
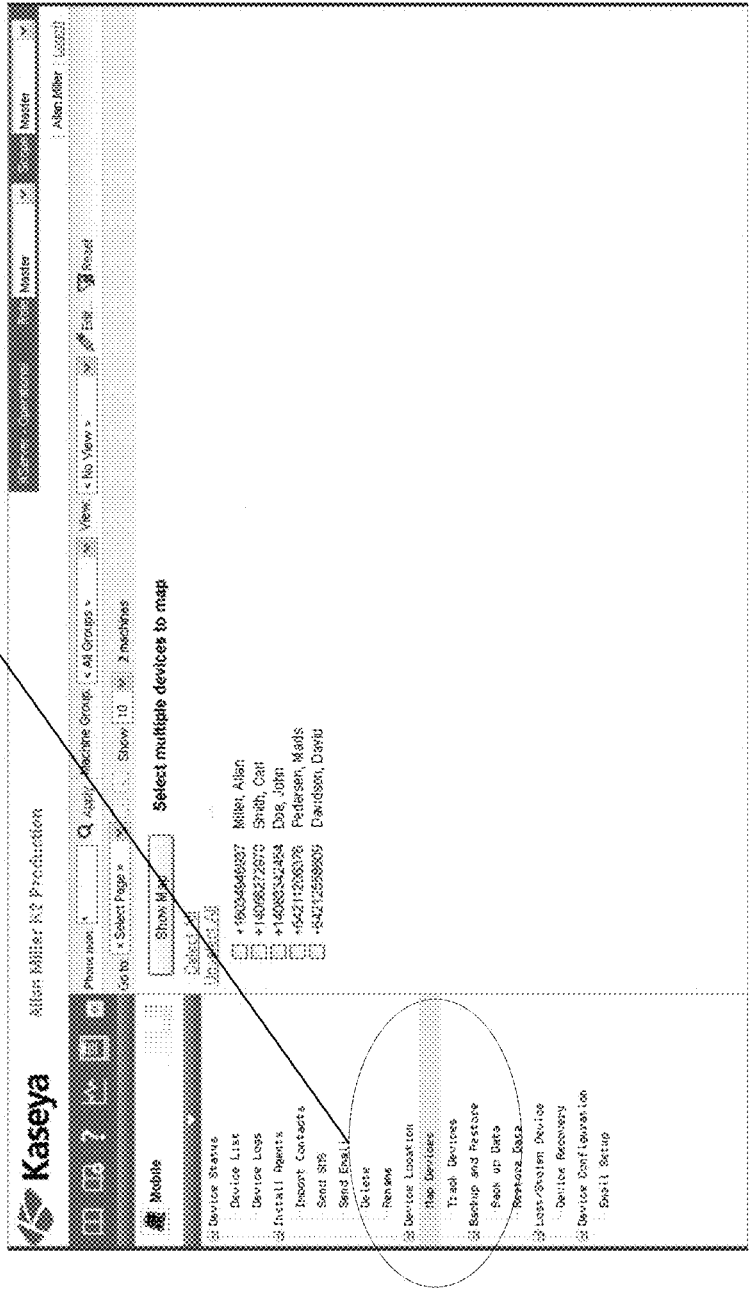
Figure 18:
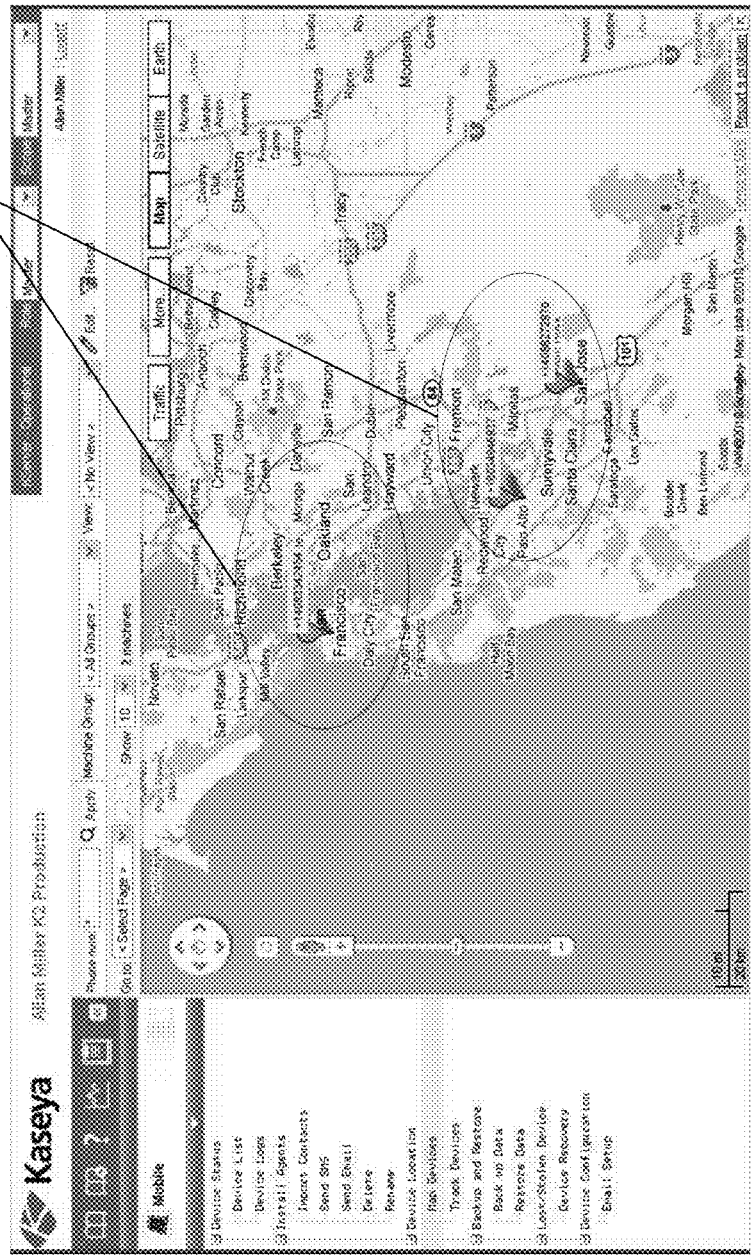
Figure 19:
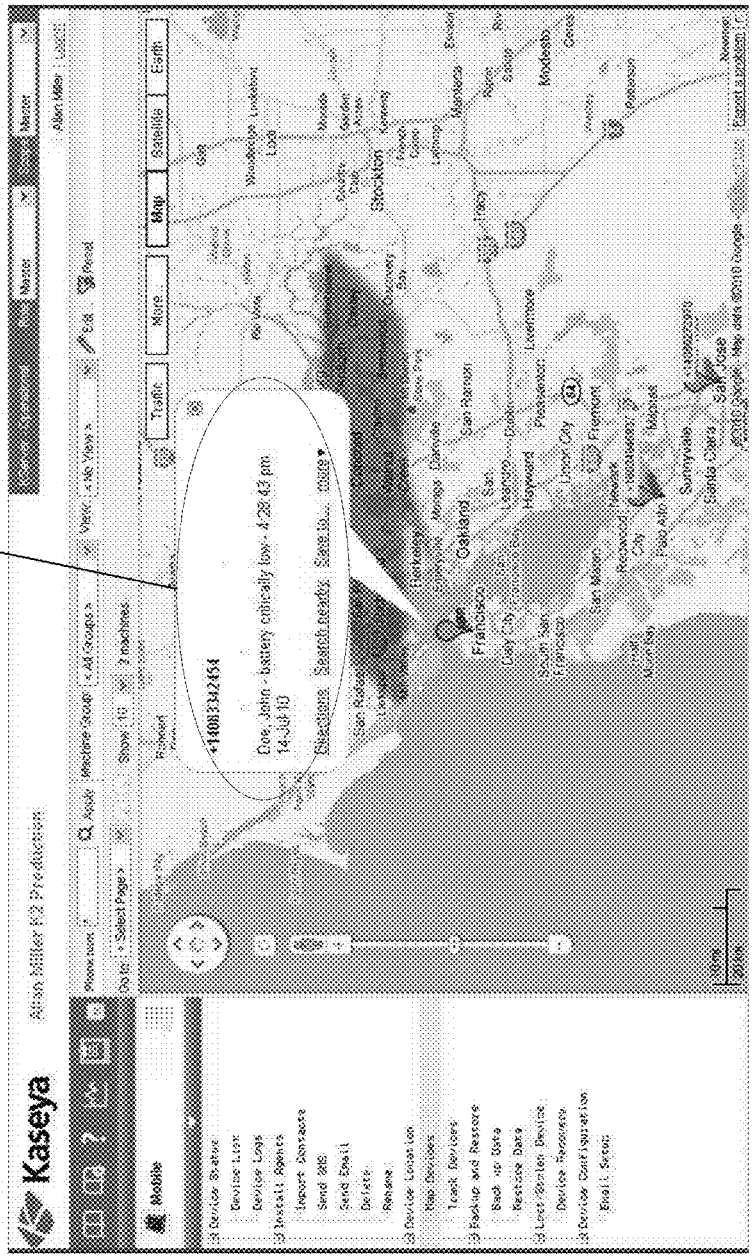
Figure 20:
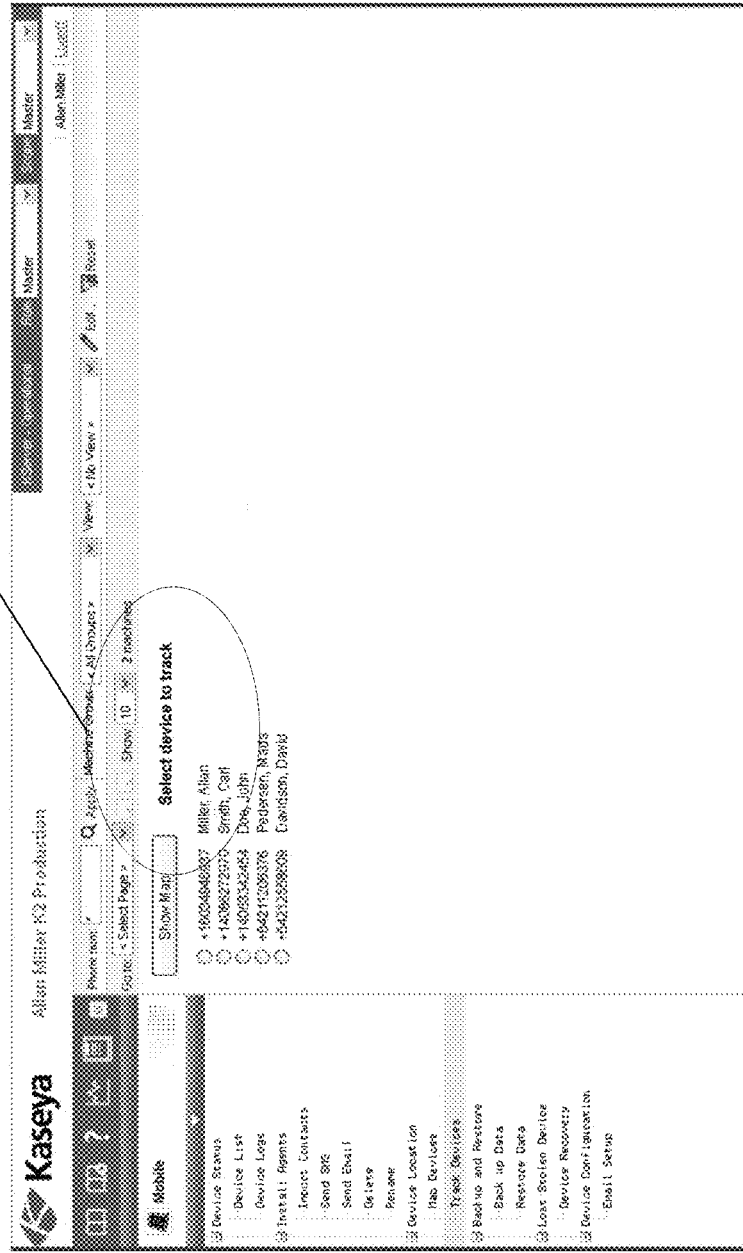

FIG. 17 illustrates the first screen of the "Map Devices" function 1702, which is used to select which devices to map. Once a set of devices is selected for mapping, the "Show Map" option may be selected to provide the display shown in FIG. 18, which is a map with the geographic device locations as indicated by 1802. The device identification is shown as a tag, as seen in FIG. 18. More extensive information about the device is available by clicking on the map pin. This brings up a caption 1902 display as illustrated in FIG. 19. The "Track Devices" function 2002 illustrates the trail of a single device over time. This begins with a page to select the device, as illustrated in FIG. 20.

Figure 21:
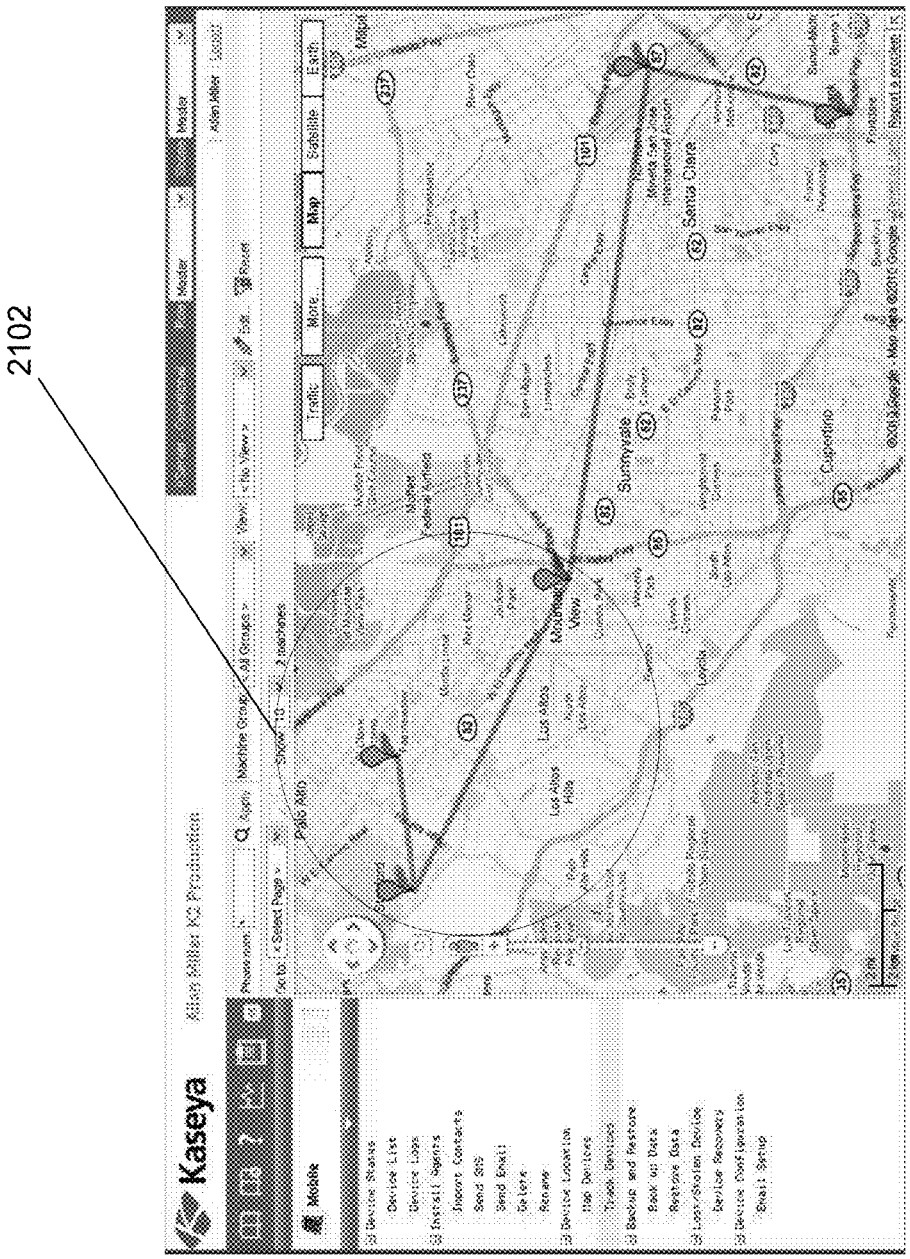

After selecting a device and clicking on "Show Map", the user is provided with a map that includes the device location(s) over time 2102 as illustrated in FIG. 21. Note that the same kind of pop-up information illustrated in FIG. 19 is also available on this map.

Figure 22:
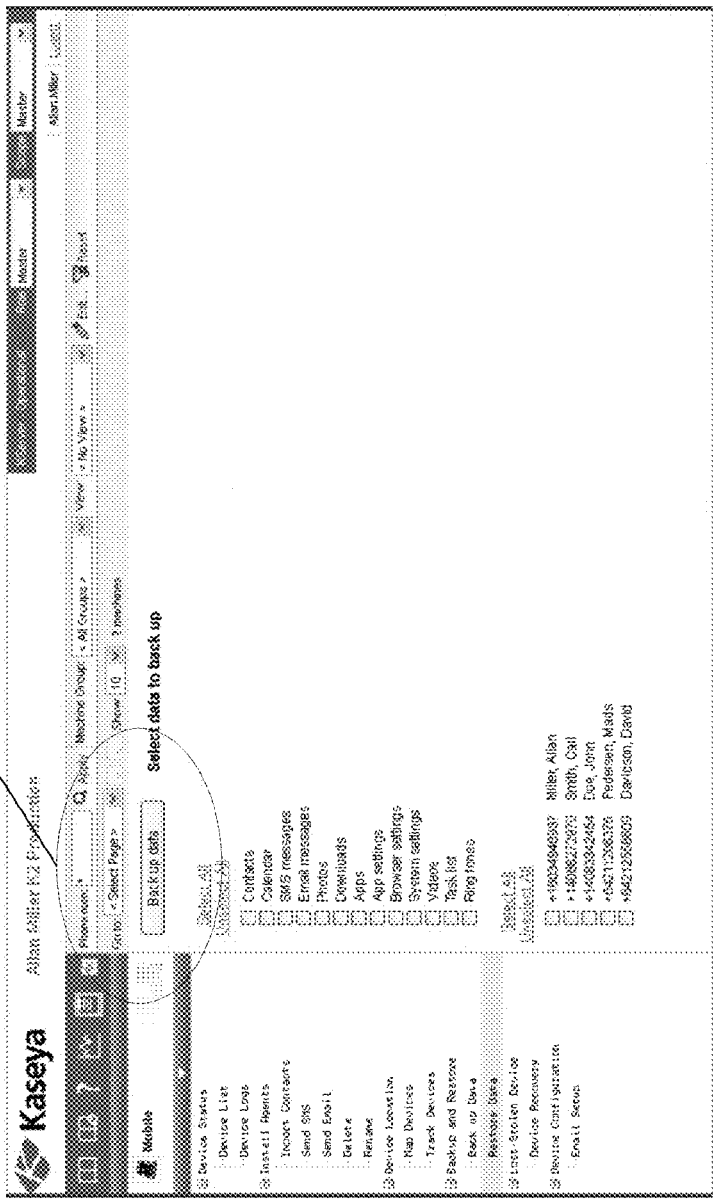
Figure 23:
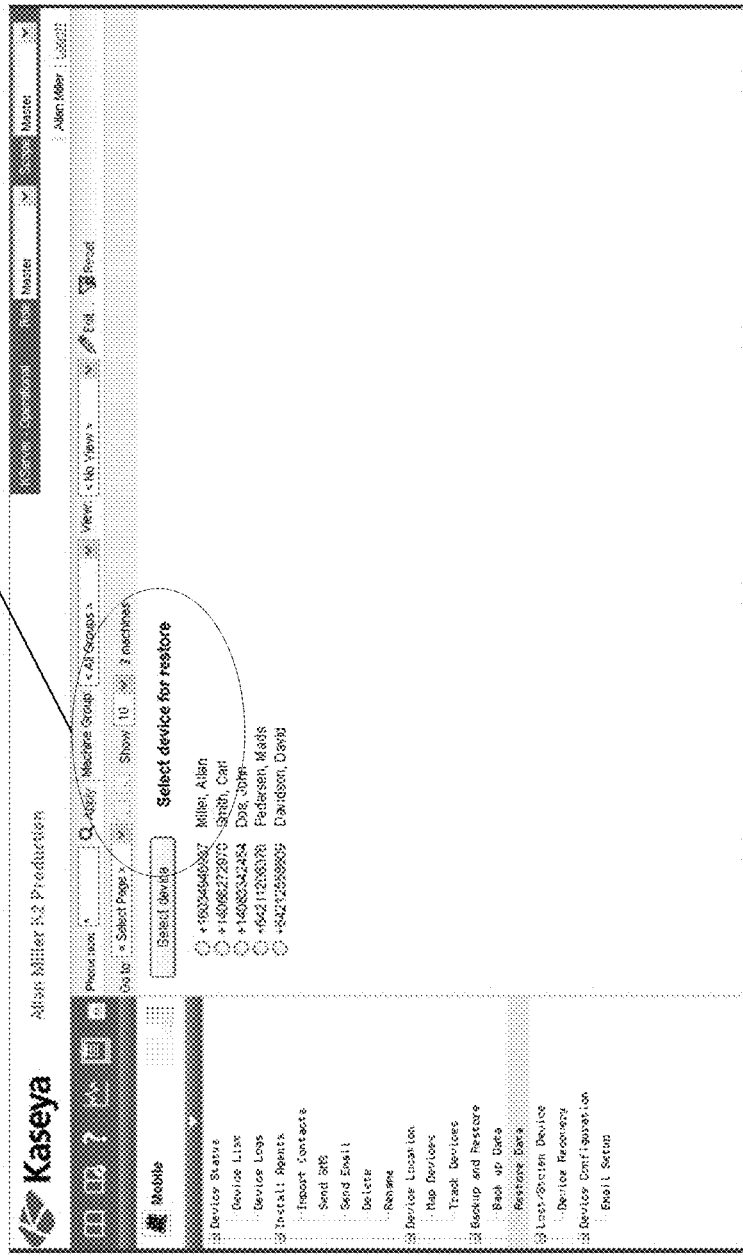
Figure 24:
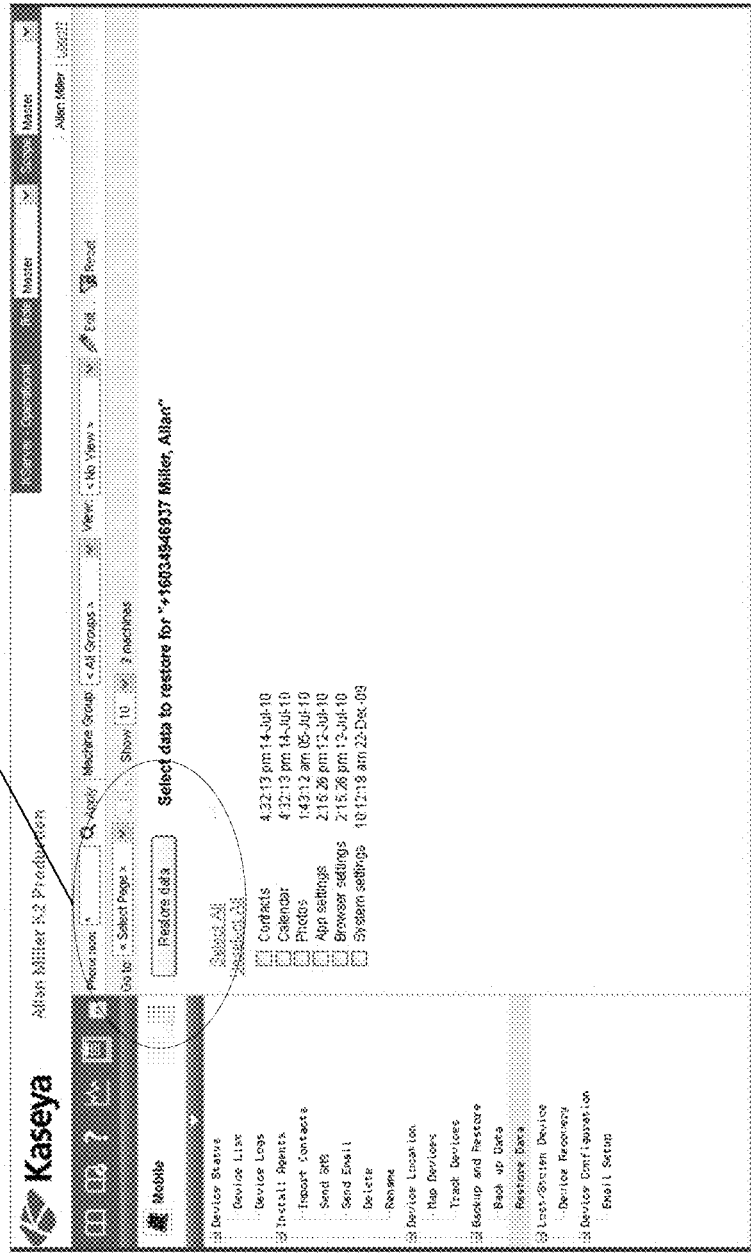

A data backup and restore function may also be provided. The backup operation is initiated using the "Backup Data" option 2202 as illustrated in FIG. 22. The user selects the items to be backed-up, then selects the devices on which to back up the data, and then selects the "Backup data" option 2202. Restoring data is a different procedure. The usual circumstances required that data be restored on one system, so the user first selects the system to be restored and then selects the "Select device" 2302 option, as illustrated in FIG. 23. The data available for restore is displayed for selection along with the time of its last backup. The user selects the items to restore and clicks on "Restore data" in order to start the restore operation in FIG. 24.

Figure 25:
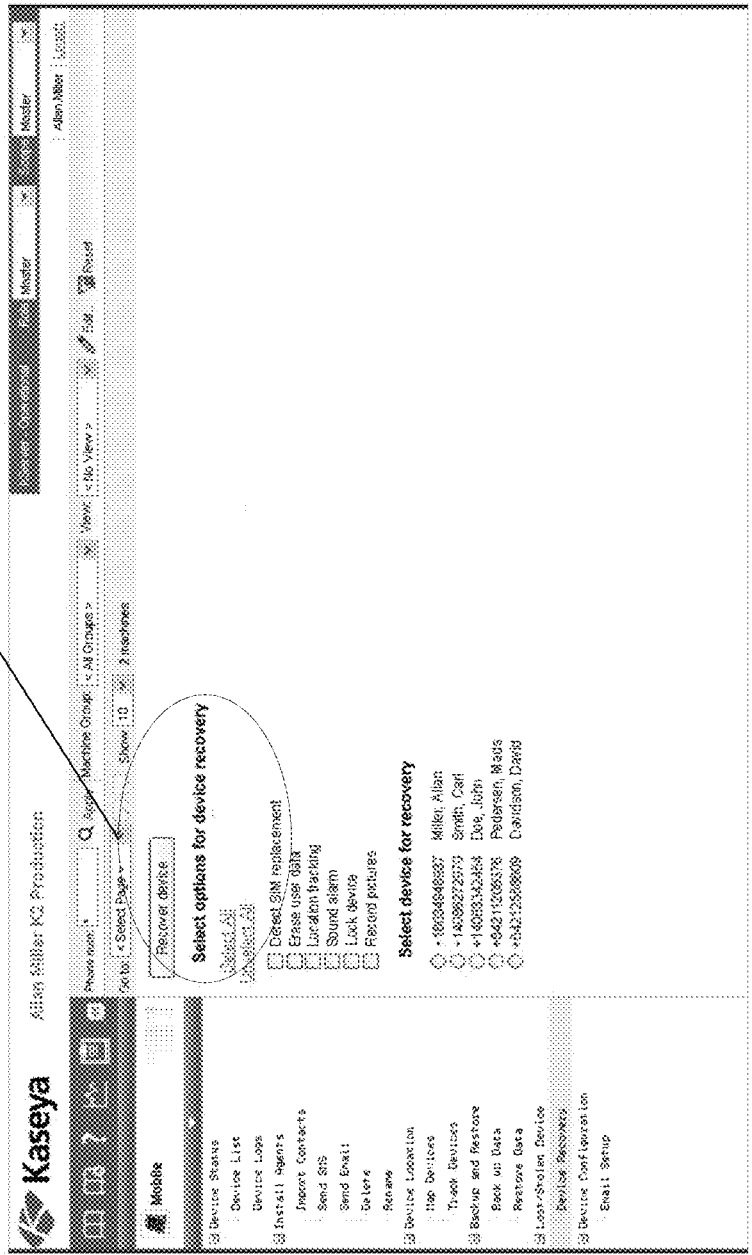
Figure 26:
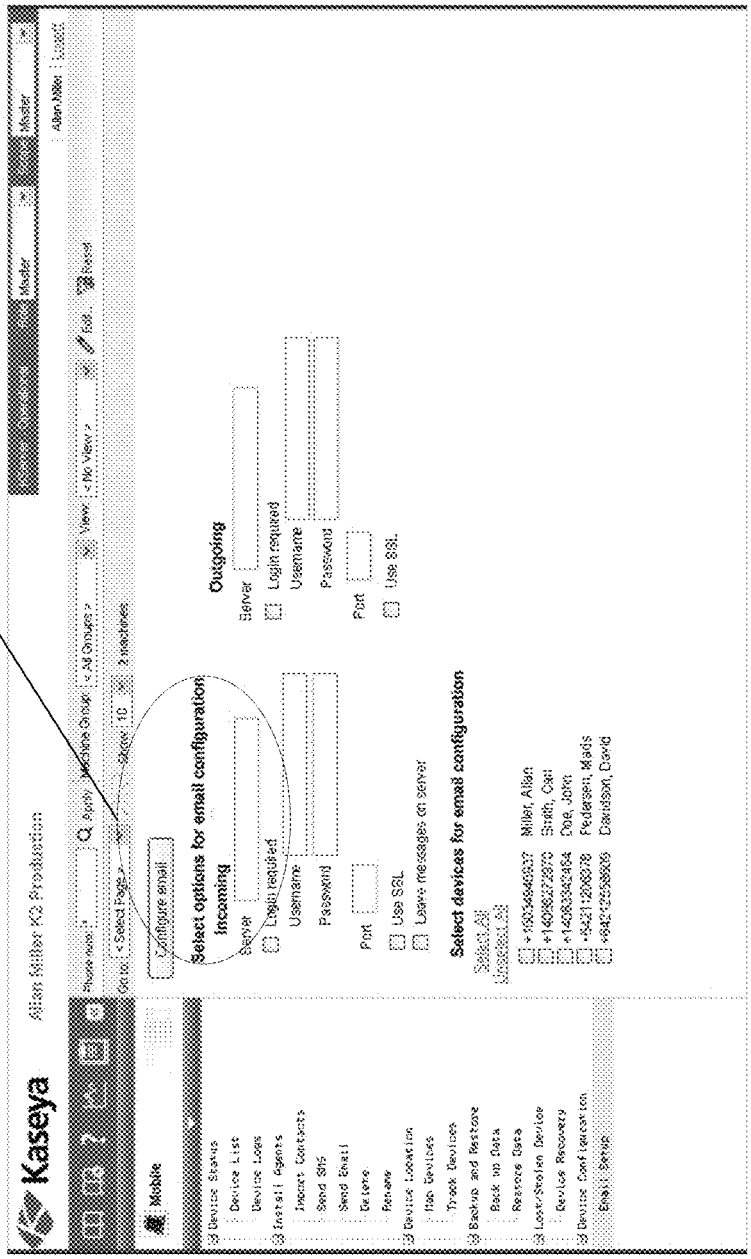

Similar to the restore function, the "Device Recovery" function only applies to a single device. However, the restore options 2502 for all devices are the same, so they can be specified along with the actual device on the same page, as illustrated in FIG. 25. The options for email configuration are also the same for all devices, but they can be applied to multiple devices. The resulting configuration screen is illustrated in FIG. 26.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 27 illustrates an example network element 2700, which may represent any of the above-described network components of FIGS. 1-7.

Figure 27:
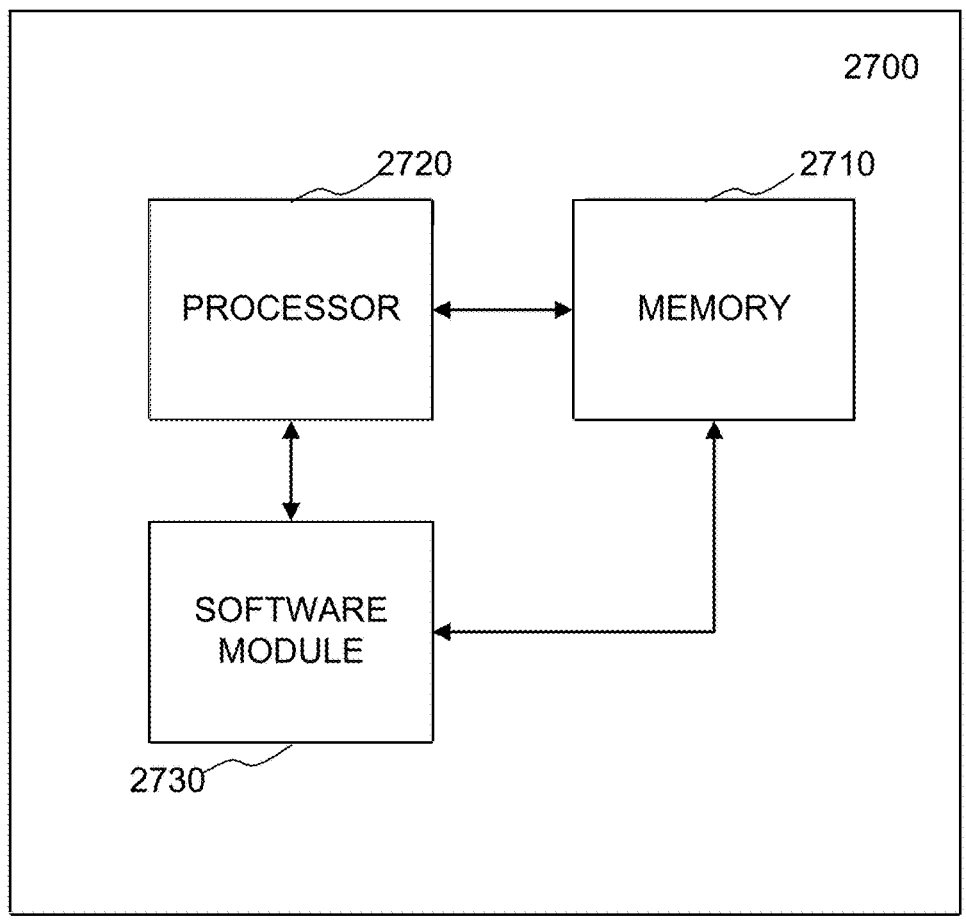
FIG. 27 illustrates an example network entity device configured to store instructions, software, and corresponding hardware for executing the same, according to example embodiments of the present invention.

As illustrated in FIG. 27, a memory 2710 and a processor 2720 may be discrete components of the network entity 2700 that are used to execute an application or set of operations. The application may be coded in software in a computer language understood by the processor 2720, and stored in a computer readable medium, such as, the memory 2710. The computer readable medium may be a non-transitory computer readable medium that includes tangible hardware components in addition to software stored in memory. Furthermore, a software module 2730 may be another discrete entity that is part of the network entity 2700, and which contains software instructions that may be executed by the processor 2720. In addition to the above noted components of the network entity 2700, the network entity 2700 may also have a transmitter and receiver pair configured to receive and transmit communication signals (not shown).

Figure 28:
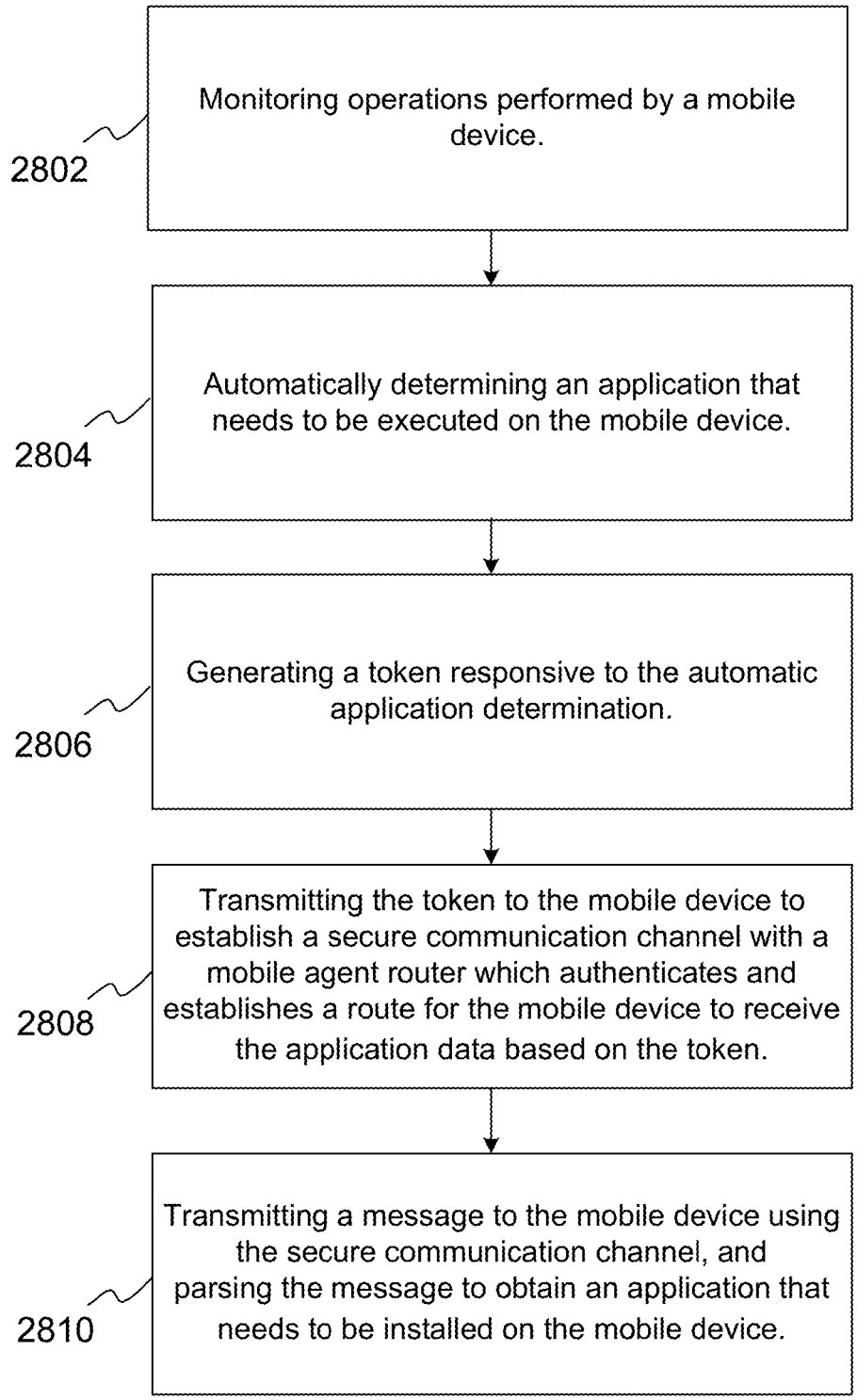
FIG. 28 illustrates an example method of operation, according to example embodiments of the present invention.

FIG. 28 illustrates an example method of operation. Referring to FIG. 28, a method of performing automated administrative operations on a mobile device is disclosed. The mobile device user may be unaware of any updates or other administrative operations being performed. The method may include monitoring operations performed by a mobile device, at operation 2802, and automatically determining an application that needs to be executed on the mobile device, at operation 2804. The method may also include generating a token responsive to the automatic application determination, at operation 2806 and transmitting the token to the mobile device to establish a secure communication channel with a mobile agent router which authenticates and establishes a route for the mobile device to receive the application data based on the token, at operation 2808. The method may also include transmitting a message to the mobile device using the secure communication channel, and parsing the message to obtain an application that needs to be installed on the mobile device, at operation 2810.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:
1. A method comprising:
monitoring operations performed by a mobile device;
automatically determining an application that needs to be executed on the mobile device;
generating a token responsive to the automatic application determination;
transmitting the token to the mobile device to establish a secure communication channel with a mobile agent router which authenticates and establishes a route for the mobile device to receive the application data based on the token;
creating an initial session between the mobile agent router and the mobile device and generating a device identifier (ID) during the initial session;
transmitting a system identifier (ID) to the mobile device during a provisioning cycle;
transmitting the device ID and the system ID to a hosted server and utilizing the device ID for subsequent identification and transmission communications;
transmitting a message to the mobile device using the secure communication channel; and parsing the message to obtain an application that needs to be installed on the mobile device.

2. The method of claim 1, wherein the monitoring of the operations performed by the mobile device is performed by a remote administrative device that determines whether an action needs to be performed on the mobile device.

3. The method of claim 1, further comprising:
accessing a software database server to obtain the application that needs to be installed on the mobile device; and
forwarding the application to the mobile device.

4. The method of claim 3, further comprising:
customizing the application to have it report to a correct management console.

5. The method of claim 1, wherein the token is a semi-private token that is delivered to its intended destination to authenticate and route the mobile device to a correct administrative server.

6. The method of claim 5, further comprising:
performing a final authentication operation at the administrative server; and
communicating at least one additional token to the mobile device.

7. The method of claim 6, wherein the at least one additional token is a secret token.

8. An apparatus comprising:
a processor configured to
monitor operations performed by a mobile device,
automatically determine an application that needs to be executed on the mobile device,
generate a token responsive to the automatic application determination,
create an initial session between a mobile agent router and the mobile device and generate a device identifier (ID) during the initial session;
a transmitter configured to
transmit the token to the mobile device to establish a secure communication channel with the mobile agent router which authenticates and establishes a route for the mobile device to receive the application data based on the token, and
transmit a system identifier (ID) to the mobile device during a provisioning cycle;
transmit the device ID and the system ID to a hosted server and utilize the device ID for subsequent identification and transmission communications;
transmit a message to the mobile device using the secure communication channel, and
wherein the processor is further configured to parse the message to obtain an application that needs to be installed on the mobile device.

9. The apparatus of claim 8, wherein the processor monitors the operations performed by the mobile device to determine whether an action needs to be performed on the mobile device.

10. The apparatus of claim 8, wherein the processor is further configured to access a software database server to obtain the application that needs to be installed on the mobile device, and forward the application to the mobile device.

11. The apparatus of claim 10, wherein the processor is further configured to customize the application to have it report to a correct management console.

12. The apparatus of claim 8, wherein the token is a semi-private token that is delivered to its intended destination to authenticate and route the mobile device to a correct administrative server.

13. The apparatus of claim 12, wherein the processor is further configured to perform a final authentication operation at the administrative server, and communicate at least one additional token to the mobile device.

14. The apparatus of claim 13, wherein the at least one additional token is a secret token.

15. A non-transitory computer readable storage medium configured to store instructions that when executed cause a processor to perform:
monitoring operations performed by a mobile device;
automatically determining an application that needs to be executed on the mobile device;
generating a token responsive to the automatic application determination;
transmitting the token to the mobile device to establish a secure communication channel with a mobile agent router which authenticates and establishes a route for the mobile device to receive the application data based on the token;
creating an initial session between the mobile agent router and the mobile device and generating a device identifier (ID) during the initial session;
transmitting a system identifier (ID) to the mobile device during a provisioning cycle;
transmitting the device ID and the system ID to a hosted server and utilizing the device ID for subsequent identification and transmission communications;
transmitting a message to the mobile device using the secure communication channel; and
parsing the message to obtain an application that needs to be installed on the mobile device.

16. The non-transitory computer readable storage medium of claim 15, wherein the monitoring of the operations performed by the mobile device is performed by a remote administrative device that determines whether an action needs to be performed on the mobile device.

17. The non-transitory computer readable storage medium of claim 15, wherein the processor is further configured to perform:
accessing a software database server to obtain the application that needs to be installed on the mobile device; and
forwarding the application to the mobile device.

18. The non-transitory computer readable storage medium of claim 17, wherein the processor is further configured to perform:
customizing the application to have it report to a correct management console.

19. The non-transitory computer readable storage medium of claim 15, wherein the token is a semi-private token that is delivered to its intended destination to authenticate and route the mobile device to a correct administrative server.

20. The non-transitory computer readable storage medium of claim 19, wherein the processor is further configured to perform:
processing a final authentication operation at the administrative server; and
communicating at least one additional token to the mobile device, the at least one additional token being a secret token.

* * * * *